United States Patent
Sumida et al.

(10) Patent No.: US 8,619,873 B2
(45) Date of Patent: Dec. 31, 2013

(54) MEDIA PROCESSING METHOD AND MEDIA PROCESSING PROGRAM

(75) Inventors: Kiyohiko Sumida, Kyoto (JP); Kensuke Odani, Kyoto (JP); Yoshihiro Koga, Osaka (JP); Takaharu Morohashi, Osaka (JP)

(73) Assignee: Panasonic Corporation, Osaka (JP)

( * ) Notice: Subject to any disclaimer, the term of this patent is extended or adjusted under 35 U.S.C. 154(b) by 86 days.

(21) Appl. No.: 13/425,851

(22) Filed: Mar. 21, 2012

(65) Prior Publication Data

US 2012/0177348 A1 Jul. 12, 2012

Related U.S. Application Data

(63) Continuation of application No. 11/464,943, filed on Aug. 16, 2006, now Pat. No. 8,170,115.

(30) Foreign Application Priority Data

Aug. 24, 2005 (JP) ................................. 2005-243326

(51) Int. Cl.
    *H04N 7/12* (2006.01)
(52) U.S. Cl.
    USPC ....................... 375/240.25; 386/215; 386/216
(58) Field of Classification Search
    USPC ..................... 375/240.25; 386/215, 216, 206, 386/219–220
    See application file for complete search history.

(56) References Cited

U.S. PATENT DOCUMENTS 5,428,730 A * 6/1995 Baker et al. ................... 715/740
5,750,911 A 5/1998 Tamura
8,009,966 B2 8/2011 Bloom et al.
2001/0037408 A1 * 11/2001 Thrift et al. ................... 709/310
2002/0147854 A1 10/2002 Frazier et al.

FOREIGN PATENT DOCUMENTS

| JP | 6-222902 | 8/1994 |
| JP | 9-114462 | 5/1997 |
| JP | 11-146362 | 5/1999 |
| JP | 2002-73334 | 3/2002 |
| JP | 2003-271406 | 9/2003 |
| WO | 2004/040576 | 5/2004 |

OTHER PUBLICATIONS

Japanese Office Action for JP 2007-532059, dated Jul. 3, 2012.
Japanese Office Action for JP 2009-291520, dated Jul. 3, 2012.
Texas Instruments Incorporated, "TMS320 DSP Algorithm Standard Rules and Guidelines," Oct. 2002.
Kato, "Program Configuration and Module Structure" in "Data Chusyouka Programming Nyumon," CQ Publishing Co., Ltd., Interface, vol. 20, No. 4, Apr. 1, 1994, pp. 86-97.

(Continued)

*Primary Examiner* — Anner Holder
(74) *Attorney, Agent, or Firm* — Greenblum & Bernstein, P.L.C.

(57) ABSTRACT

A media processing method for performing media processing by causing a processor to execute plural program modules, includes controlling input/output of media data, determining at least one call time, and calling a second program module in a second layer at each determined call time, by executing a first program module in a first layer, the first layer being higher than the second layer. The method further includes causing the processor to perform data conversion on the media data, by executing the second program module in the second layer, the data conversion being part of the media processing.

26 Claims, 21 Drawing Sheets

(56) References Cited

OTHER PUBLICATIONS

Zimmermann, "OSI Reference Model—The ISO Model of Architecture for Open Systems Interconnection", IEEE Transactions on Communications, IEEE Service Center, Piscataway, NJ, US, vol. COM-28, No. 4, Apr. 1, 1980, pp. 425-432, XP000814440.

Arakawa et al., "software architecture for flexible and extensible image decoding", Signal Processing. Image Communication, Elsevier Science Publishers, Amsterdam, NL, vol. 10, No. 1-3, Jul. 1, 1997, pp. 235-248, XP004082709.

Japanese Office Action dated Jan. 15, 2013.

\* cited by examiner

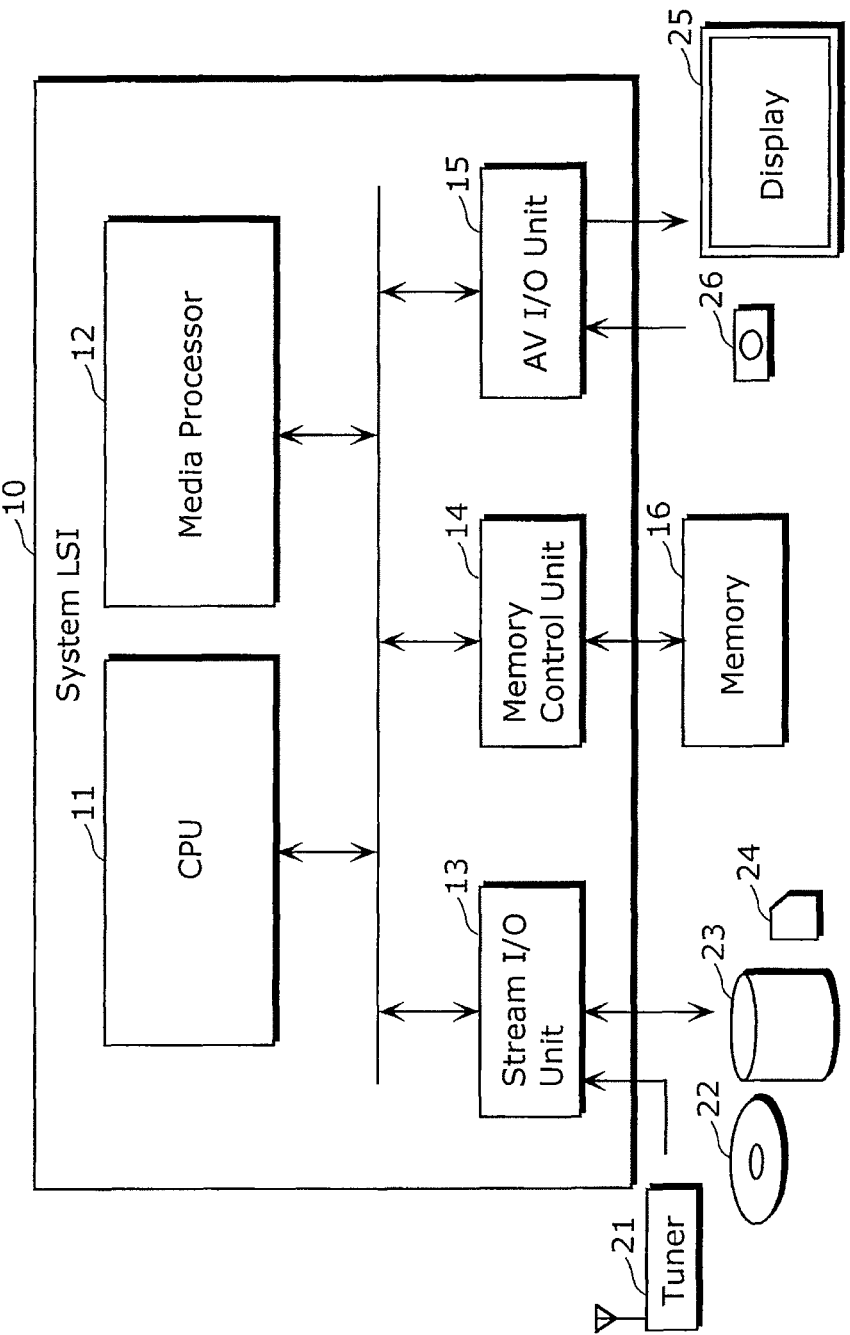

MEDIA PROCESSING METHOD AND MEDIA PROCESSING PROGRAM

CROSS REFERENCE RELATED TO APPLICATION

This is a continuation application of pending U.S. application Ser. No. 11/464,943 filed on Aug. 16, 2006, which claims priority of Japanese Application No. 2005-243326, filed on Aug. 24, 2005, the disclosures of which are expressly incorporated herein by reference in their entirety.

BACKGROUND OF THE INVENTION (1) Field of the Invention

The present invention relates to a media processing method and a media processing program for causing a computer to perform media processing including decoding and encoding of audio-visual data.

(2) Description of the Related Art

In recent years, various types of digital home appliances, which perform media processing including decoding and encoding of audio/visual data, are being produced.

Technology which implements a software module, which controls a DSP for performing media processing, as a library and utilizes the library has been disclosed (for example, see Non-Patent Reference 1: Texas Instruments Incorporated, *TMS320 DSP Algorithm Standard Rules and Guidelines* (Rev. E), Oct. 17, 2002). FIG. 1 is a block diagram showing a configuration of media processing software that controls a DSP as provided in the related art. As shown in this diagram, the software includes a time management module 501, a media processing control module 502, and a data conversion processing library 504. The data conversion processing library 504 has plural library modules, each of which performs processing such as audio encoding/decoding, audio filtering, video encoding/decoding, and so on in predetermined units of data. The media processing control module 502 causes each type of media processing to be performed by calling combinations of necessary library modules via a data conversion API. The time management module 501 manages the times at which the library modules are called by the media processing control module 502, thereby maintaining real-time functionality.

Accordingly, generic media processing units are implemented as library modules, making it possible to reuse the software.

SUMMARY OF THE INVENTION

However, with the abovementioned related art, software modules, which are in a layer higher than that of library modules, must be separately developed for each different product, such as digital televisions, cellular phones, digital cameras, digital movie players, DVD recorders, home network servers, and so on; thus, there is a problem in that software development is overly burdensome.

Furthermore, specification changes must be compatible with each different product, and thus there is a problem in that it is difficult to ensure the quality of the software. Factors such as the following can be considered as specification changes in a product: (a) changing the grain of control in accordance with the desires of a user; for example, macro-level controls such as playback/stop and micro-level controls such as 1 frame/1 image decoding; (b) adding/changing functions (trick play, recording during audio/video playback, and so on) or changing the system control (audio/video synchronization, external input/output control, and so on) according to application functions or audio/visual system configurations; (c) changing/adding signal processing systems by upgrading the version of a standard or refining an algorithm; (d) implementation of some functions as hardware, due to declining costs, increased processing efficiency, compatibility with other hardware; and so on.

An object of the present invention is to provide a media processing method and a media processing program which improves the efficiency of software development and the quality of the software.

To solve the abovementioned problem, the media processing method of the present invention performs media processing by causing a processor to execute plural program modules, and includes: a first step of controlling input/output of media data, determining at least one call time, and calling a second program module in a second layer at each determined call time, by executing a first program module in a first layer, the first layer being higher than the second layer; a second step of calling at least one third program module in a third layer, the third layer being lower than the second layer, by executing the second program module in the second layer; and a third step of causing the processor to perform data conversion on the media data, the data conversion being an element of the media processing, by executing the third program module in the third layer.

With such a configuration, it is possible to increase the efficiency of developing software for implementing the media processing method. In other words, the compatibility with software modules can be expanded by standardizing roles, functions, control levels, and interfaces on a layer-by-layer basis. Accordingly, the reusability of the developed software modules can be increased, and the effectiveness of software development over a wide range of target fields, from mobile devices to servers, can be improved.

Furthermore, it is possible to improve the quality of the software design. That is, the software can be made easier to understand by clarifying and commonizing software design principles through classification. Furthermore, the design quality can be improved by reusing a standardized software structure.

Here, the first program module may have first, second, third, and fourth program segments, and the first step may include: a command processing step of analyzing a command from a host program, the host program being in a layer higher than the first layer, by executing the first program segment; a timing determination step of determining an operation timing of the third program segment and at least one of the call times, in accordance with the analyzed command, by executing the second program segment; an input/output control step of controlling the input/output of the media data in accordance with the operation timing, by executing the third program segment; and a first calling step of calling a second program module at each call time, by executing the fourth program segment.

Moreover, the first program segment may receive the command via a first application program interface, the command specifying starting, stopping, or pausing the media processing.

Moreover, the second program module may have fifth, sixth, and seventh program segments, and the second step may include: a receiving step of receiving data to be processed from the first program module, by executing the fifth program segment; a second calling step of calling, in order, at least one third program module for processing the received data, by executing the sixth program segment; and a sending step of sending a resultant of the data conversion from the called third program module to the first program module, by executing the seventh program segment.

Moreover, in the second step, at least one third program module may be called, in order, for processing the received data, and a resultant returned to the first program module, by executing the second program module, and in the first step, output of the data returned from the second program module may be controlled, by executing the first program module.

Moreover, in the first calling step, at least one third program module may be specified.

Moreover, in the first calling step, operation parameters for at least one third program module may be specified.

Moreover, in the first calling step, an execution order of at least one third program module may be specified.

With the above configuration, it is possible to flexibly adapt to changes within various types of devices, and possible to increase the compatibility with the program modules. For example, it is possible to easily adapt to a change in control grain; in other words, it is possible to easily adapt to each control grain, such as macro-level controls including playback/stop and micro-level controls such as 1 frame/1 image decoding.

In addition, it is easy to adapt to changes in the functions of the application acting as a host and in control systems that depend on the system configuration; it is also possible to localize the impact of adding/changing functions (trick play, recording during playback, and so on) or changing the system control (audio/video synchronization, external input/output control, and so on) according to application functions or system configurations.

Furthermore, it is possible to easily adapt to changes or additions in AV encoding standards, AV signal processing algorithms, and the like. That is, the impact of changing/adding signal processing systems by upgrading the version of a standard or refining an algorithm can be localized.

Further still, it is possible to easily adapt to some functions being implemented as hardware. The impact of software corresponding to the case where some functions are implemented as hardware, due to declining costs, increased processing efficiency, compatibility with other hardware, and so on, can be localized to the program modules which correspond to those functions, and thus it is possible to keep software changes to a minimum.

Moreover, a program according to the present invention is a computer-readable program executed by a processor in order to perform media processing, and includes: a first program module in a first layer which controls input/output of media data, determines at least one call time, and calls a second program module in a second layer at the determined call time, the first layer being higher than the second layer; a second program module in a second layer which calls at least one third program module in a third layer, the third layer being lower than the second layer; and at least one third program module in a third layer which causes the processor to perform data conversion on the media data, the data conversion being an element of the media processing.

Accordingly, with the media processing method and program according to the present invention, it is possible to increase the efficiency of developing software for implementing the media processing method, and to improve the quality of software design. It is further possible to flexibly adapt to changes in various types of devices, and possible to increase the compatibility with the program modules.

FURTHER INFORMATION ABOUT TECHNICAL BACKGROUND TO THIS APPLICATION

The disclosure of Japanese Patent Application No. 2005-243326, filed on Aug. 24, 2005, including specification, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a block diagram showing a configuration of a system LSI used in media processing in an embodiment of the present invention;

NUMERICAL REFERENCES

Figure 1:
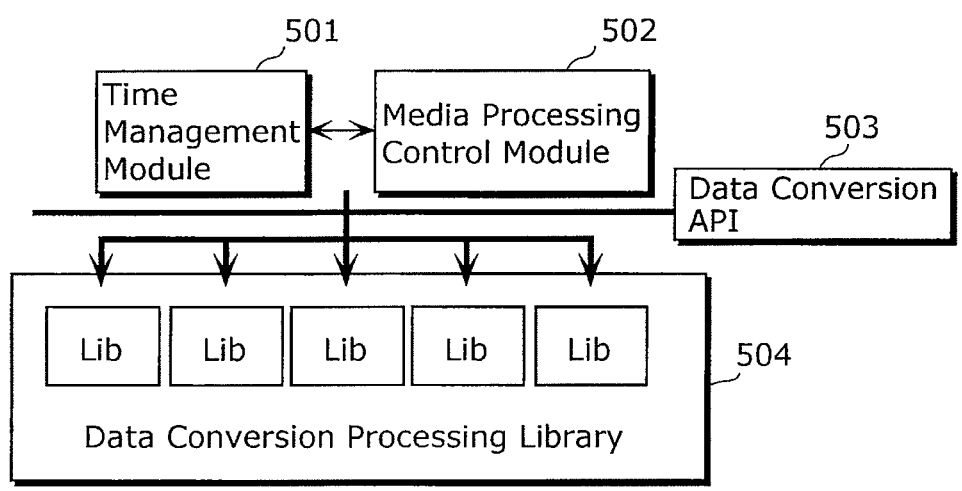
FIG. 1 is a block diagram showing a configuration of media processing software that controls a DSP as provided in the related art.

11 CPU
12 media processor
13 stream I/O unit
14 memory control unit
15 AV I/O unit
16 memory
21 tuner
22 optical disk
23 hard disk
24 memory card
25 display
26 camera
30 camera
100 device control level API
101 Media Module (MM) layer program module
101b audio playback MM
101c audio recording MM
101d video playback MM
101e video recording MM
102 command processing unit
103 time management unit
104 data input/output control unit
105 media data conversion control unit
200 media data conversion API
201 Media Controller (MC) layer program module
201c audio playback media controller
201d audio recording MC
201e multiplexing MC
201f demultiplexing MC
201i video playback MC
201j video recording MC
202 data receiving unit
203 data sending unit
204 parameter receiving unit
205 media data conversion unit
300 simple data conversion API
301 ML layer program module

DESCRIPTION OF THE PREFERRED EMBODIMENT

A media processing method, program, and apparatus provided in the embodiment of the present invention shall hereby be described. First, a hardware configuration for performing media processing shall be described.

FIG. 2 is a block diagram showing a configuration of a system LSI used in media processing in the embodiment of the present invention. In this diagram, a system LSI 10 includes a CPU 11, a media processor 12, a stream I/O unit 13, a memory control unit 14, and an AV I/O unit 15.

The CPU 11 performs overall control of the system LSI 10, including sending and receiving commands between the system LSI and the exterior, controlling the media processor 12, and so on. The media processor 12 performs media processing under the control of the CPU 11. Media processing includes audio encoding, audio decoding, moving picture encoding, moving picture decoding, video telephone processing, and so on. The stream I/O unit 13 inputs/outputs stream data. Inputting/outputting stream data refers to, for example, inputting stream data from an external tuner 21, inputting/outputting stream data to/from an optical disk 22, a hard disk 23, or a memory card 24, and so on. The memory control unit 14 controls access to a memory 16. The AV I/O unit 15 inputs/outputs AV (Audio and Video) data. Inputting/outputting AV data refers to, for example, outputting AV data to a display 25, inputting AV data from a camera 26, and so on. The memory 16 stores software for the CPU 11 and the media processor 12, AV data, stream data, intermediate data used during media processing, and so on.

Figure 3A:
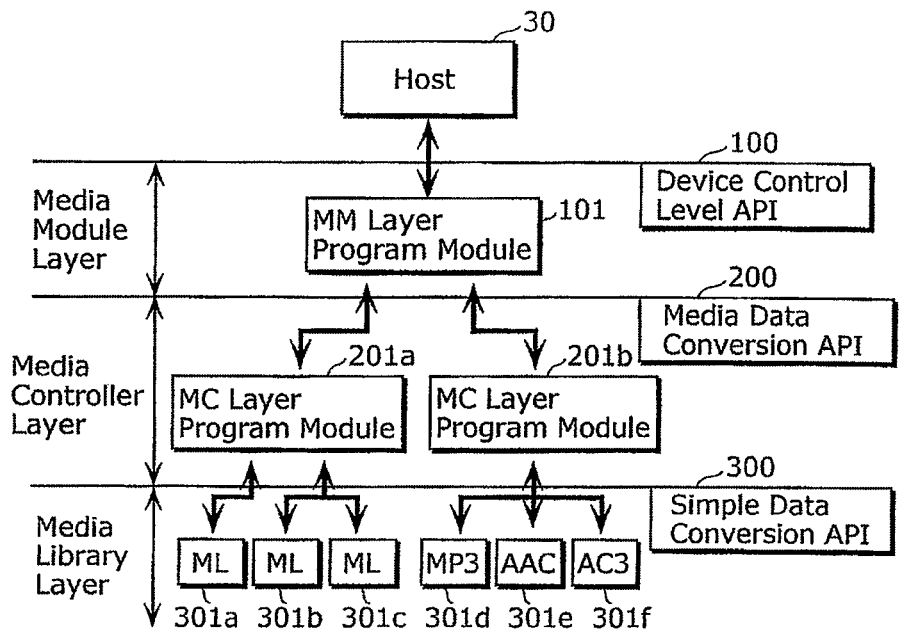
FIG. 3A is a block diagram showing a configuration of software for controlling a media processor.

FIG. 3A is a block diagram showing a configuration of software for controlling the media processor 12. This software is a program for implementing media processing in the media processor 12, and is divided into three layers: a media module layer, a media controller layer, and a media library layer. Here, "layer" refers to an aggregate of program modules that implement a certain function and provide an interface to a higher layer. Layers are separated by distinct Application Program Interfaces (APIs). In FIG. 3A, the APIs between the layers are called a device control level API 100, a media data conversion API 200, and a simple data conversion API 300, respectively. The media module layer includes a Media Module (MM) layer program module 101. The media controller layer includes Media Controller (MC) layer program modules 201*a* and 201*b*. The media library layer includes Media Library (ML) layer program modules 301*a* to 301*f*.

The media module layer uses the media controller layer to implement independent media processing functions, such as AV playback, video telephony, audio recording, and the like. The media module layer includes at least one MM layer program module (also simply called "media module" or "MM").

Figure 3B:
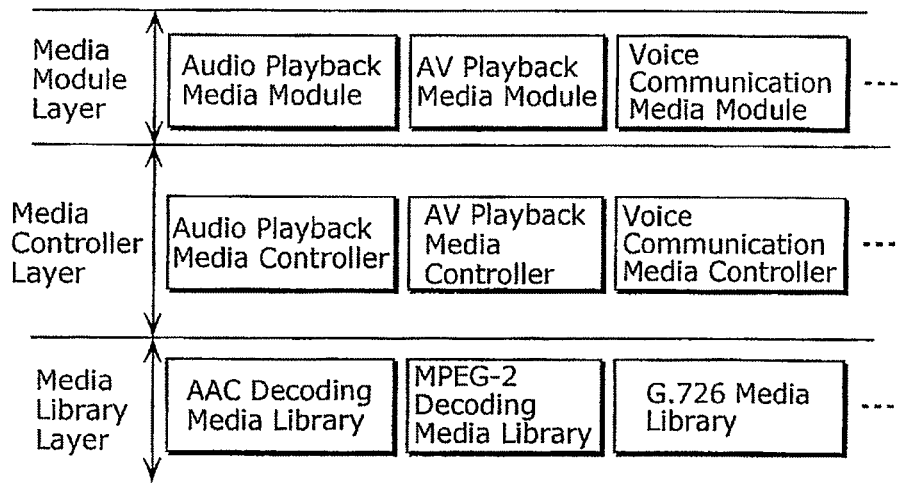
FIG. 3B is a block diagram showing one example of a configuration of software for controlling a media processor.

The MM layer program module 101 implements such functions as interfacing with the CPU 11, maintaining real-time processing by controlling startup timing of the media controller layer, external input/output, and so on. For example, as shown in FIG. 3B, there are the following types of MM layer program modules: an MM layer program module for performing audio playback (called "audio playback media module"); an MM layer program module for performing AV data playback (called "AV playback media module"); an MM layer program module for performing voice communications (called "voice communication media module"); and the like.

The media controller layer uses the media library layer, thereby providing, to the media module layer, basic media processing functions per domain, such as audio, video, and the like. The media controller layer includes at least one MC layer program module (also simply called "Media Controller" or "MC").

The MC layer program modules 201*a* and 201*b* each perform sequence control, lock control, resource management and the like between media libraries, as well as resolving differences among media libraries, providing a unified interface to the media module layer. For example, as shown in FIG. 3B, there are the following types of MC layer program modules: an MC layer program controller for audio playback (called "audio playback media controller"); an MC layer program controller for AV data playback (called "AV data playback media controller"); an MC layer program controller for performing voice communications (called "voice communication media controller"); and the like.

The media library layer includes codecs, filters, and so on which independently implement the most basic media processing functions. The ML layer program modules 301a to 301f implement these basic media processing functions through the media processor. The basic media processing functions are the smallest units of media processing functions in the present embodiment. As shown in FIG. 3B, there are the following ML layer program modules: an ML layer program library for decoding audio in the AAC format (called "AAC decoding media library"); an ML layer program library for performing playback of AV data in the MPEG-2 format (called "MPEG-2 decoding media library"); an ML layer program library for performing voice communication (called "G.726 media library"); and the like.

Figure 4:
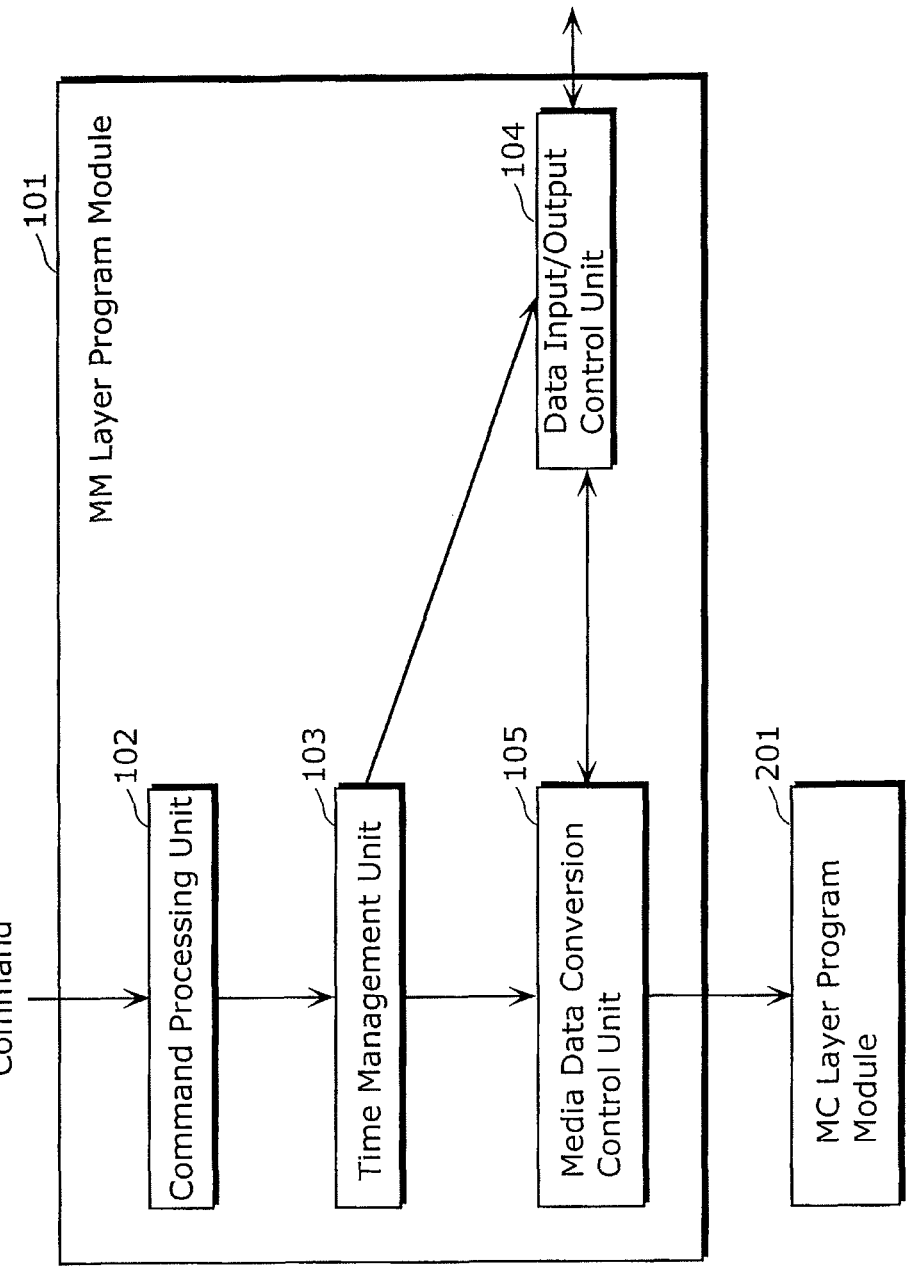
FIG. 4 is a block diagram showing a configuration of a media module layer program module.

FIG. 4 is a block diagram showing a configuration of a media module layer program module. The control grain and API are uniform for all program modules in the MM layer, and therefore this diagram shows a representative configuration of the MM program module 101, which may have differing types. The MM layer program module 101 includes a command processing unit 102, a time management unit 103, a data input/output control unit 104, and a media data conversion control unit 105.

The command processing unit 102 provides an interface for a host to use media processing functions. To be more specific, the command processing unit 102 sends and receives command/data between a host CPU application, analyzes commands, manages states of media modules, and manages control parameters between the host CPU and the media processor. Furthermore, as mentioned earlier, the MM layer program module 101 basically performs non-real-time, coarse grain controls, such as starting, stopping, or pausing media processing. The command processing unit 102 handles non-real-time communication with the host. The host is not required to perform real-time processing which modules in the lower layers are required to perform. Accordingly, the command processing unit 102 can reduce impact occurring at the time of a command from the host, a change in control timing, and the like, reducing the impact on lower layers. To rephrase, the API from the host to the command processing unit 102 can change depending on the system in which the system LSI is implemented. In this case, if the system requirements are identical, an interface from the command processing unit 102 to the time management unit 103 does not undergo change.

The time management unit 103 determines the operation timing of the data input/output control unit 104 in accordance with the command analyzed by the command processing unit 102, and determines a time at which the media data conversion control unit 105 calls the MC layer program module 201. The time of the call is the time of each frame cycle. Here, in video data, "frame" refers to a single image among images that make up a moving picture, and in audio data, "frame" refers to a group of a predetermined number of sampling data (for example, 1024). Accordingly, the time management unit 103 controls the operation timing of the data input/output control unit 104 and the media data conversion control unit 105, thereby maintaining real-time functionality. Furthermore, when the demanded media processing functions cover a range of areas, such as audio, video, and so on, as is the case with AV playback, the time management unit 103 effects synchronization between these areas.

The data input/output control unit 104 controls the input/output of media data to/from the MC layer program module 201 in accordance with the operation timing determined by the time management unit 103. For example, in the case where the MM layer program module 101 is an audio playback media module, the data input/output control unit 104 controls the input of encoded audio data from the stream I/O unit 13 to the audio playback media module and the output of decoded audio data from the audio playback media module to the AV I/O unit 15.

Figure 12:
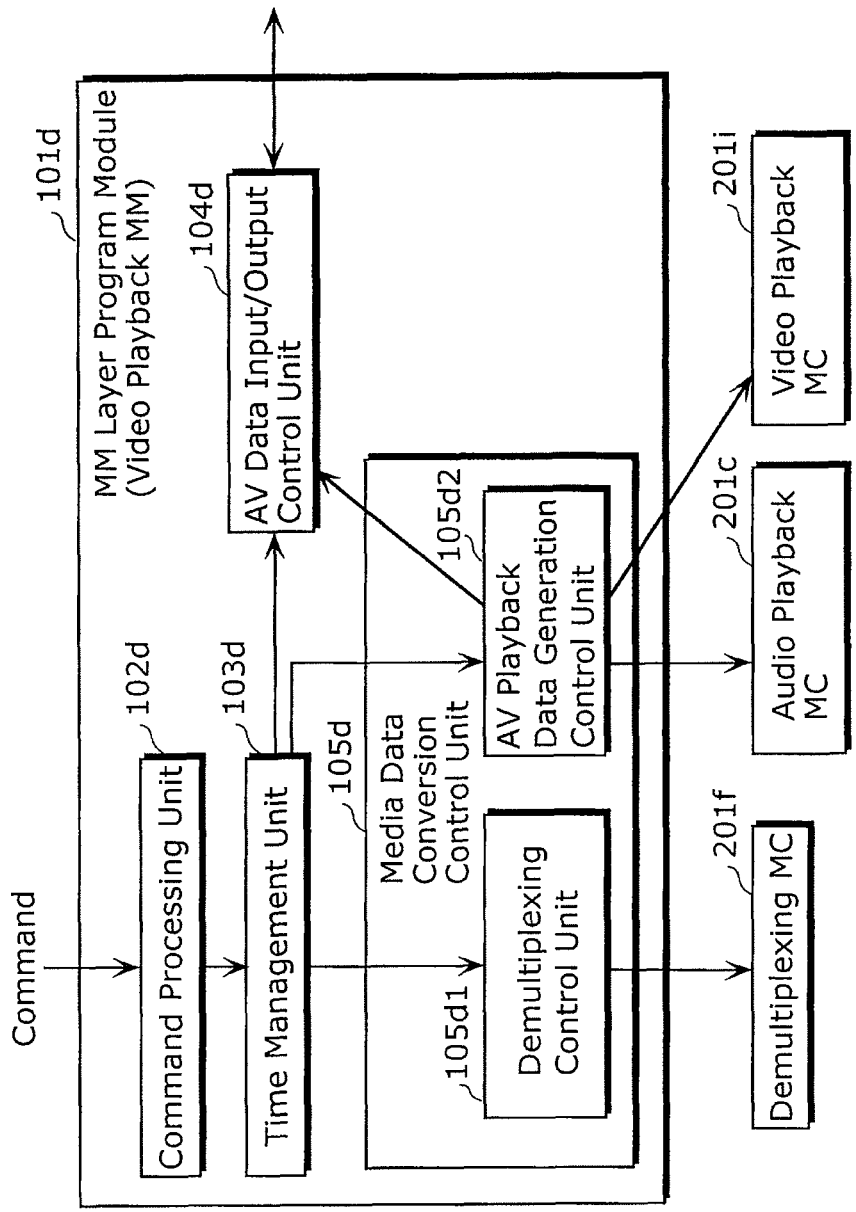
FIG. 12 is a block diagram showing a configuration of a media module layer program module (video playback MM)

The media data conversion control unit 105 calls the MC layer program module 201 at the time determined by the time management unit 103. For example, in the case where the MM layer program module 101 is an AV data playback media module, as shown in FIG. 12, the media data conversion control unit 105 calls a demultiplexing MC layer program module 201f, for demultiplexing audio data and video data from the stream, an audio playback MC layer program module 201c, and a video playback MC layer program module 201i.

Figure 5:
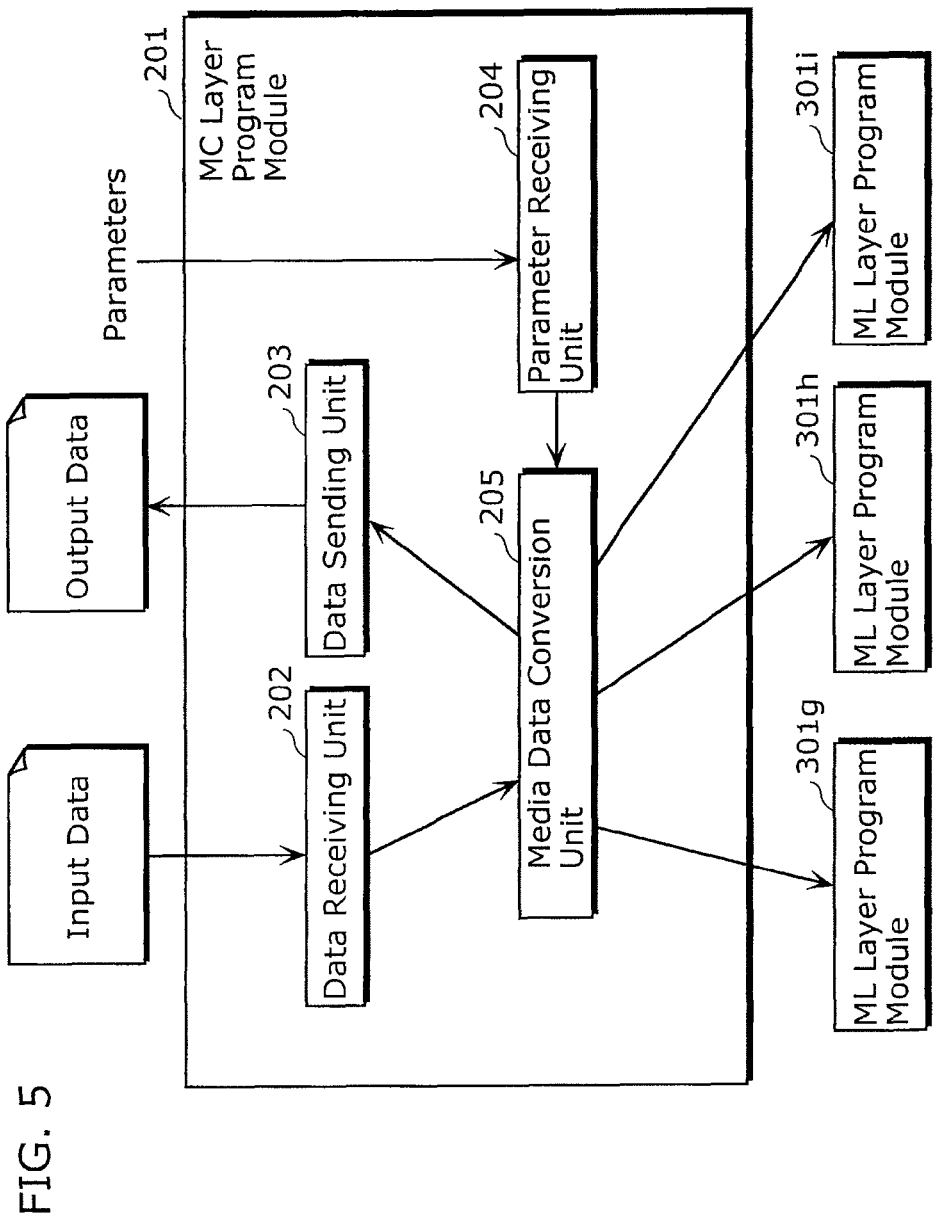
FIG. 5 is a block diagram showing a configuration of a media controller layer program module.

FIG. 5 is a block diagram showing a configuration of a media controller layer program module. A control grain and API are uniform for all program modules in the MC layer, and therefore this diagram shows a representative configuration of the MC program modules 201, which may have differing types. This MC layer program module 201 includes a data receiving unit 202, a data sending unit 203, a parameter receiving unit 204, and a media data conversion unit 205.

The data receiving unit 202 receives, from the MM layer program module 101, data that is to be processed.

The data sending unit 203 sends data conversion results from an ML layer program module 301 to the MM layer program module 101 as output data.

The parameter receiving unit 204 receives specifications from the MM layer program module 101, such as a specification of plural ML layer program modules 301 and a specification of the calling order thereof, a specification of the operation parameters for each ML layer program module 301, and so on.

Figure 7:
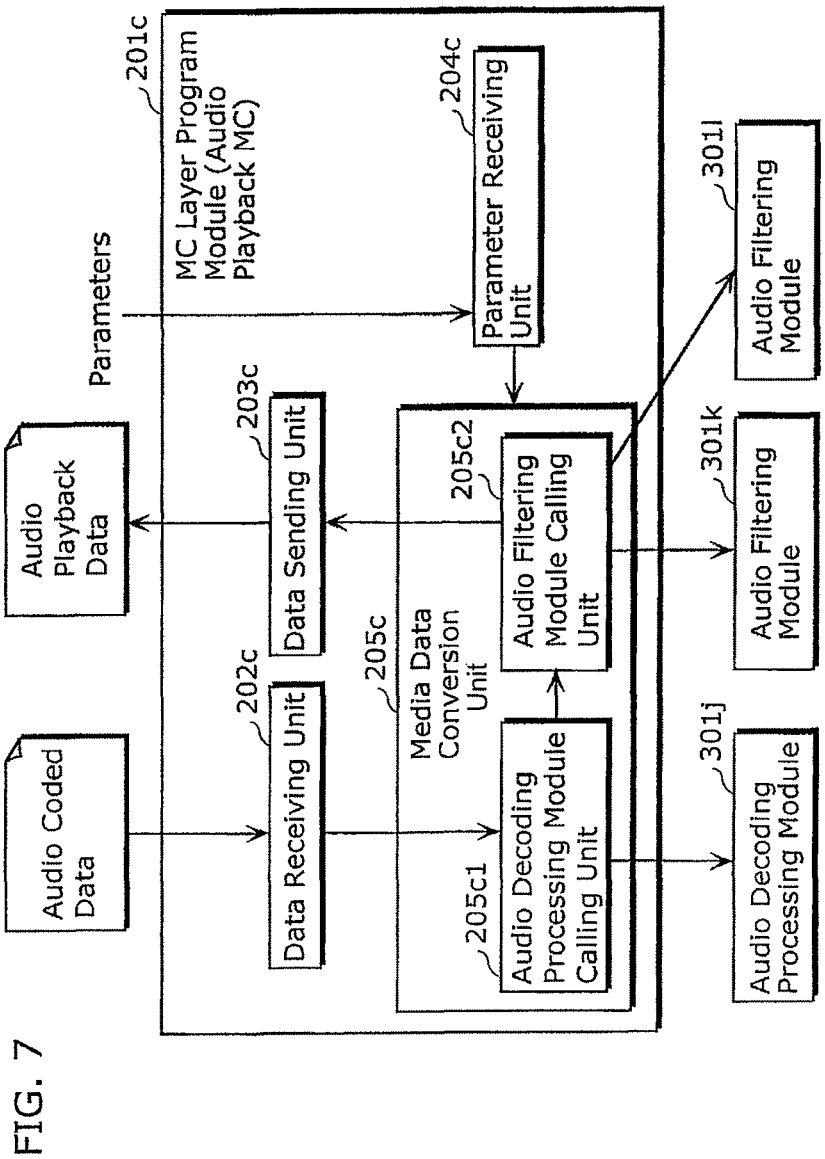
FIG. 7 is a block diagram showing a configuration of a media controller layer program module (audio playback MC)

The media data conversion unit 205 successively calls plural types of ML layer program modules, such as 301g to 301i, so as to process input data received by the data receiving unit 202, and passes a final resultant of the data processing to the data sending unit 203. At this time, the processing resultant of each ML layer program module 301 is passed on to the ML layer program module 301 that is called next. For example, in the case where the MC layer program module 201 is an audio playback media controller 201c, as shown in FIG. 7, an audio decoding module library 301j, an audio filtering module library 301k, and an audio filtering module library 301l are successively called.

Note that the aforementioned specifications received by the parameter receiving unit 204 may be partially or completely omitted. In such a case, a media data conversion control unit 205c may utilize pre-set default data.

Figure 6:
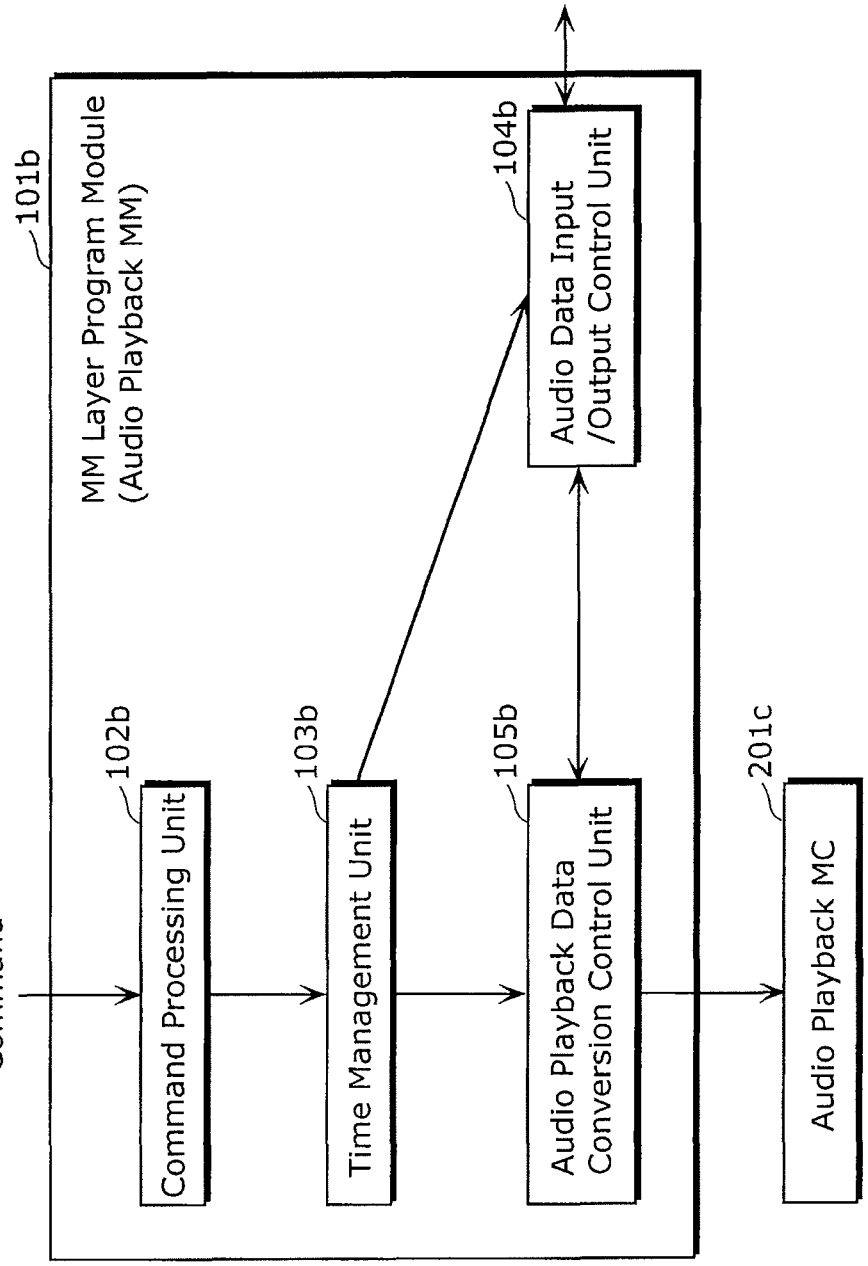
FIG. 6 is a block diagram showing a configuration of a media module layer program module (audio playback MM)

FIG. 6 is a block diagram showing a configuration of a media module layer program module (audio playback MM). In FIG. 6, an audio playback MM 101b has the same configuration as the MM layer program module 101 shown in FIG. 4, and is designed for use in audio playback.

A command processing unit 102b receives and analyzes commands related to audio playback. A time management unit 103b determines the operation timing of an audio data input/output control unit 104b and a call time in each audio frame cycle. Upon this determination, the audio data input/output control unit 104b controls the input of encoded audio data from the stream I/O unit 13 and the output of decoded audio data to the AV I/O unit 15. A media data conversion control unit 105b calls an audio playback MC 201c at the determined time.

With this configuration, the audio playback MM 101b receives operation commands such as play, stop, settings, and so on from the host, and along with state transitions, instructs the audio playback media controller in accordance with the state. In the playback state, the audio playback media controller is instructed to perform frame playback in a certain time interval (automatic operation), while the encoded data is supplied to the audio playback media controller.

FIG. 7 is a block diagram showing a configuration of a media controller layer program module (audio playback MC). In FIG. 7, an audio playback MC 201b has the same configuration as the MC layer program module 201 shown in FIG. 5, and is designed for use in audio playback. Also in this diagram, a data receiving unit 202c receives encoded audio data (audio coded data) from the audio playback MM 101b. A data sending unit 203c sends audio data (audio playback data).

A parameter receiving unit 204c receives specifications from the audio playback MM 101b, such as a specification of plural ML layer program modules 301 (an audio decoding module 301j, an audio filtering module 301k, an audio filtering module 301l) and a specification of the calling order thereof, and a specification of the operation parameters for each ML layer program module 301.

A media data conversion control unit 205c includes an audio decoding module calling unit 205c1 and an audio filtering module calling unit 205c2. The audio decoding module calling unit 205c1 calls an audio decoding module 301j of the media library layer, which decodes encoded audio data. The audio filtering module calling unit 205c2 calls an audio filtering module 301k, which performs first-step filtering of decoded audio data from the audio decoding module 301j, and furthermore calls an audio filtering module 301l, which performs second-step filtering on the post-first-step filtering audio data.

With such a configuration, upon receiving an instruction to play back one frame from the audio playback media module, the audio playback MC 201c acquires the encoded data, decodes and filters the data, outputs one frame worth of PCM data, and stops (this being a single operation). Actual decoding and filtering are executed by calling an audio decoding library and an audio filtering library respectively. Moreover, the audio decoding library is synchronously started by a function call from the media controller, and decodes one frame worth of MP3, AAC, or other such data.

Figure 8:
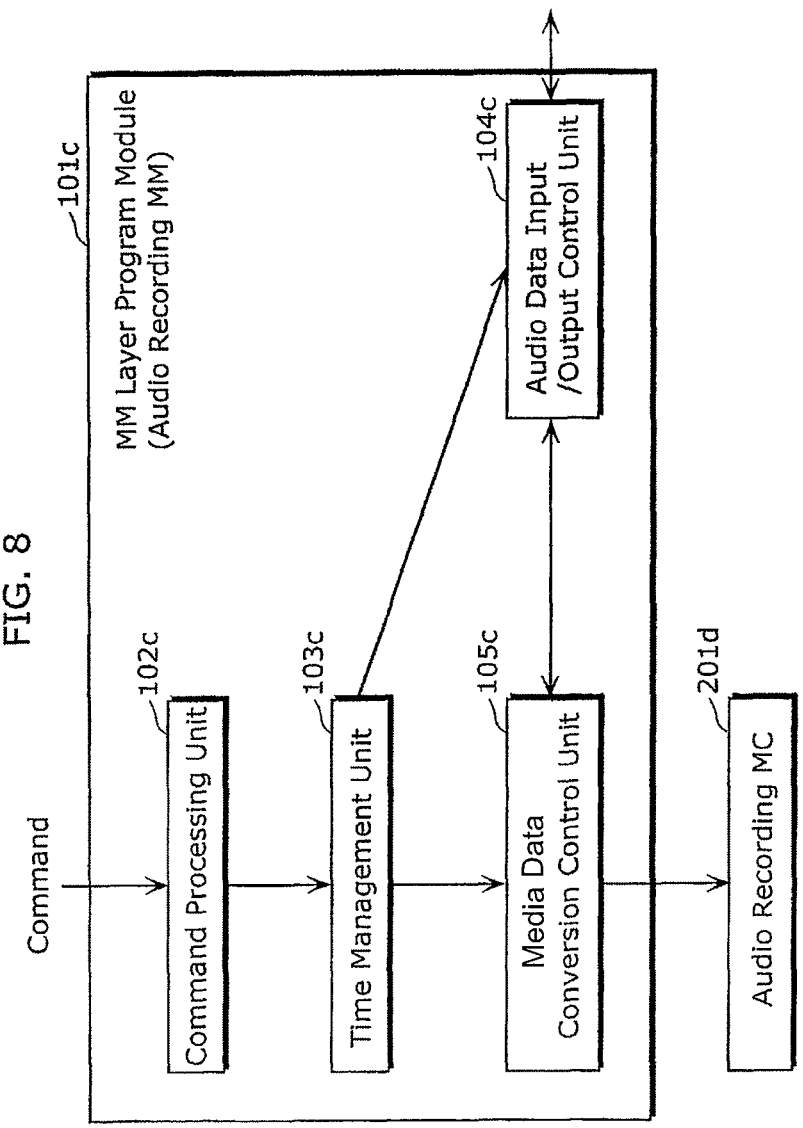
FIG. 8 is a block diagram showing a configuration of a media module layer program module (audio recording MM)

FIG. 8 is a block diagram showing a configuration of a media module layer program module (audio recording MM). In FIG. 8, an audio recording MM 101c has the same configuration as the MM layer program module 101 shown in FIG. 4, and is designed for use in audio recording.

A command processing unit 102c receives and analyzes commands related to audio recording. A time management unit 103c determines the operation timing of an audio data input/output control unit 104c and a call time in each audio frame cycle. Upon this determination, the audio data input/output control unit 104c controls the input of audio data from the AV I/O unit 15 and the output of encoded audio data to the stream I/O unit 13. A media data conversion control unit 105c calls an audio recording MC 201d at the determined time.

Figure 9:
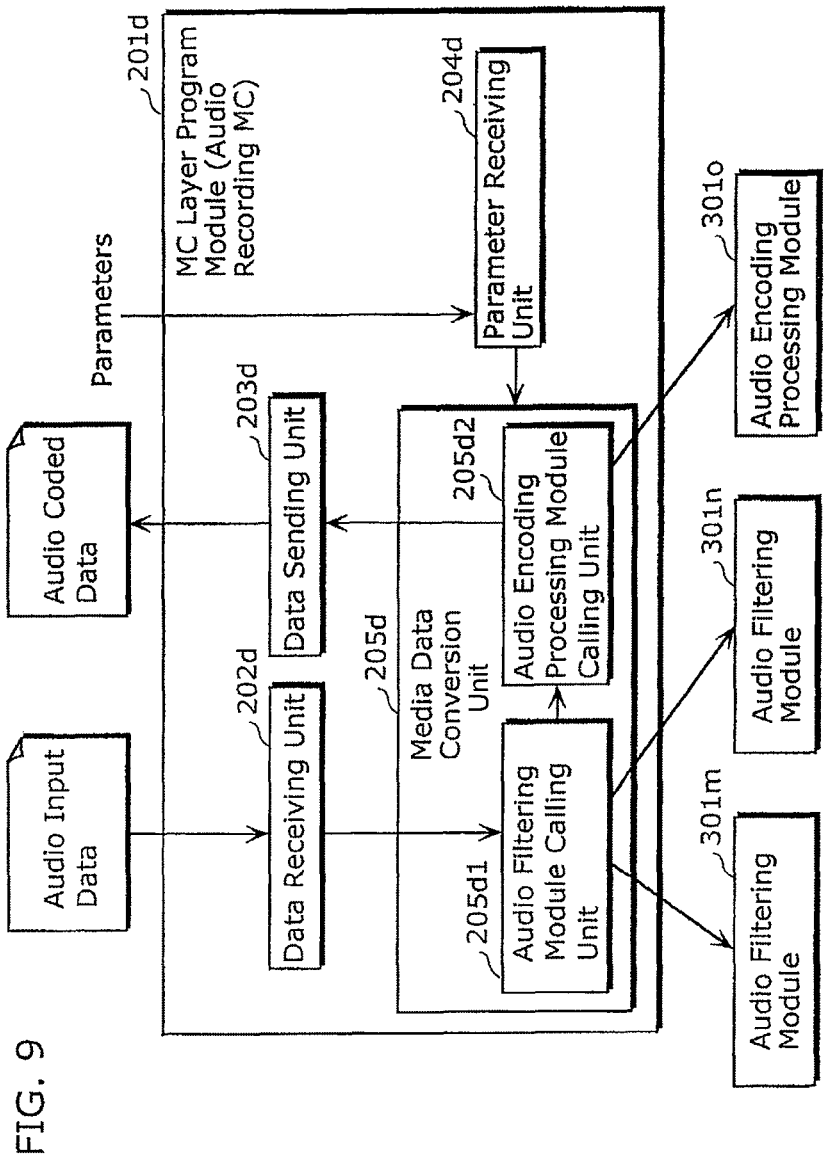
FIG. 9 is a block diagram showing a configuration of a media controller layer program module (audio recording MC)

FIG. 9 is a block diagram showing a configuration of a media controller layer program module (audio recording MC). In FIG. 9, an audio recording MC 201d has the same configuration as the MC layer program module 201 shown in FIG. 5, and is designed for use in audio recording. Also in this diagram, a data receiving unit 202d receives audio data (audio input data) from the audio recording MM 101c. A data sending unit 203d sends encoded audio data (audio coded data) to the audio recording MM 101c.

A parameter receiving unit 204d receives specifications from the audio recording MM 101c, such as a specification of plural ML layer program modules 301 (an audio filtering module 301m, an audio filtering module 301n, an audio encoding module 301o) and a specification of the calling order thereof, and a specification of the operation parameters for each ML layer program module 301.

A media data conversion control unit 205d includes an audio filtering module calling unit 205d1 and an audio encoding module calling unit 205d2. The audio filtering module calling unit 205d1 calls an audio filtering module 301m, which performs first-step filtering on audio data, and furthermore calls an audio filtering module 301n, which performs second-step filtering on the post-first-step filtering audio data. The audio encoding module calling unit 205d2 calls an audio encoding module 301o of the media library layer, which encodes the post-second-step filtering audio data.

Figure 10:
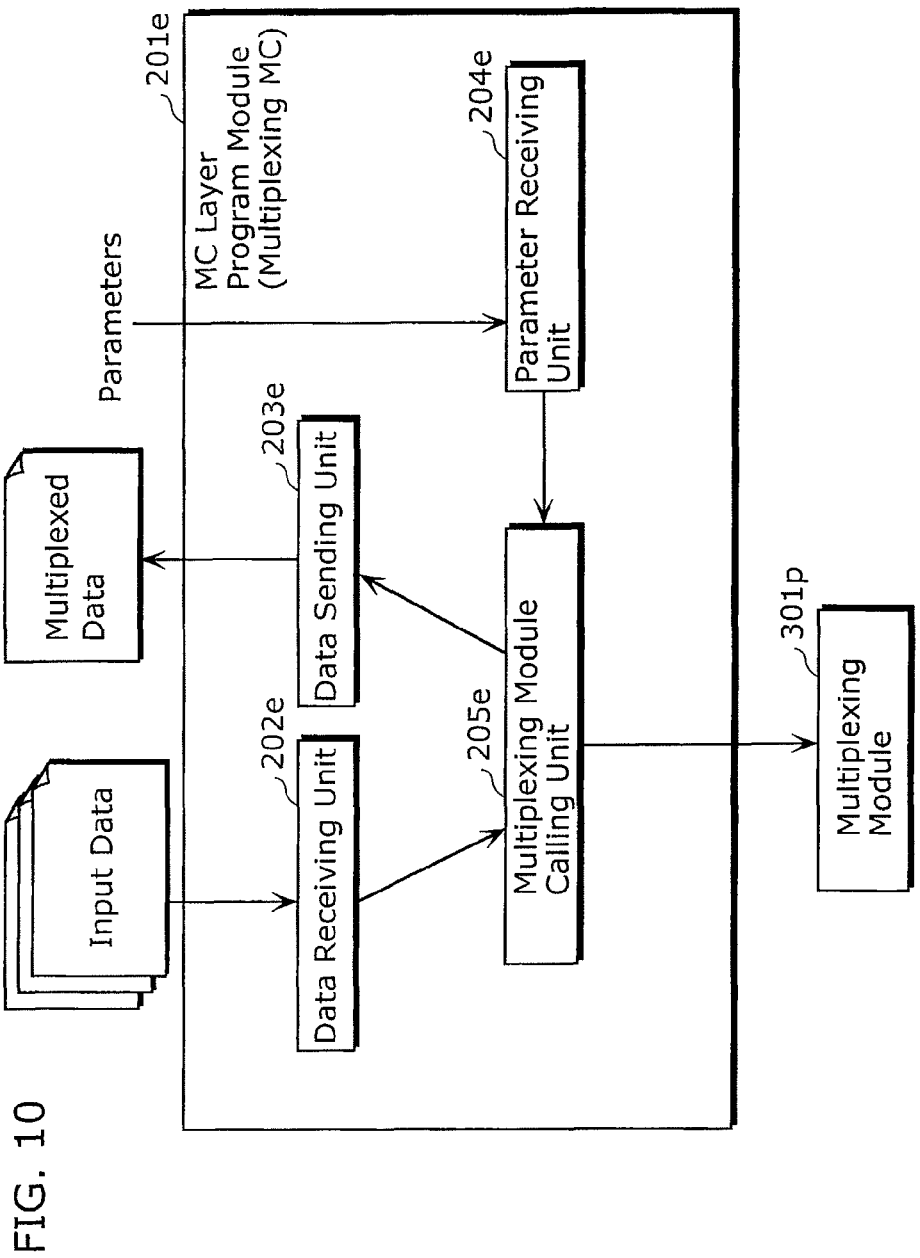
FIG. 10 is a block diagram showing a configuration of a media controller layer program module (multiplexing MC)

FIG. 10 is a block diagram showing a configuration of a media controller layer program module (multiplexing MC). In FIG. 10, a multiplexing MC 201e has the same configuration as the MC layer program module 201 shown in FIG. 5, and is designed for use in multiplexing plural types of data. A data receiving unit 202e receives plural types of input data, such as encoded audio data and encoded video data, from the AV data encoding MM and the like. A data sending unit 203e sends multiplexed data to the AV data encoding MM and the like. A parameter receiving unit 204e receives specifications from a video recording MM and the like, such as a specification of an ML layer program module 301 (a multiplexing module 301p) and a specification of operation parameters thereof, and so on. A media data conversion unit 205e repeatedly calls the multiplexing processing module 301p.

Figure 11:
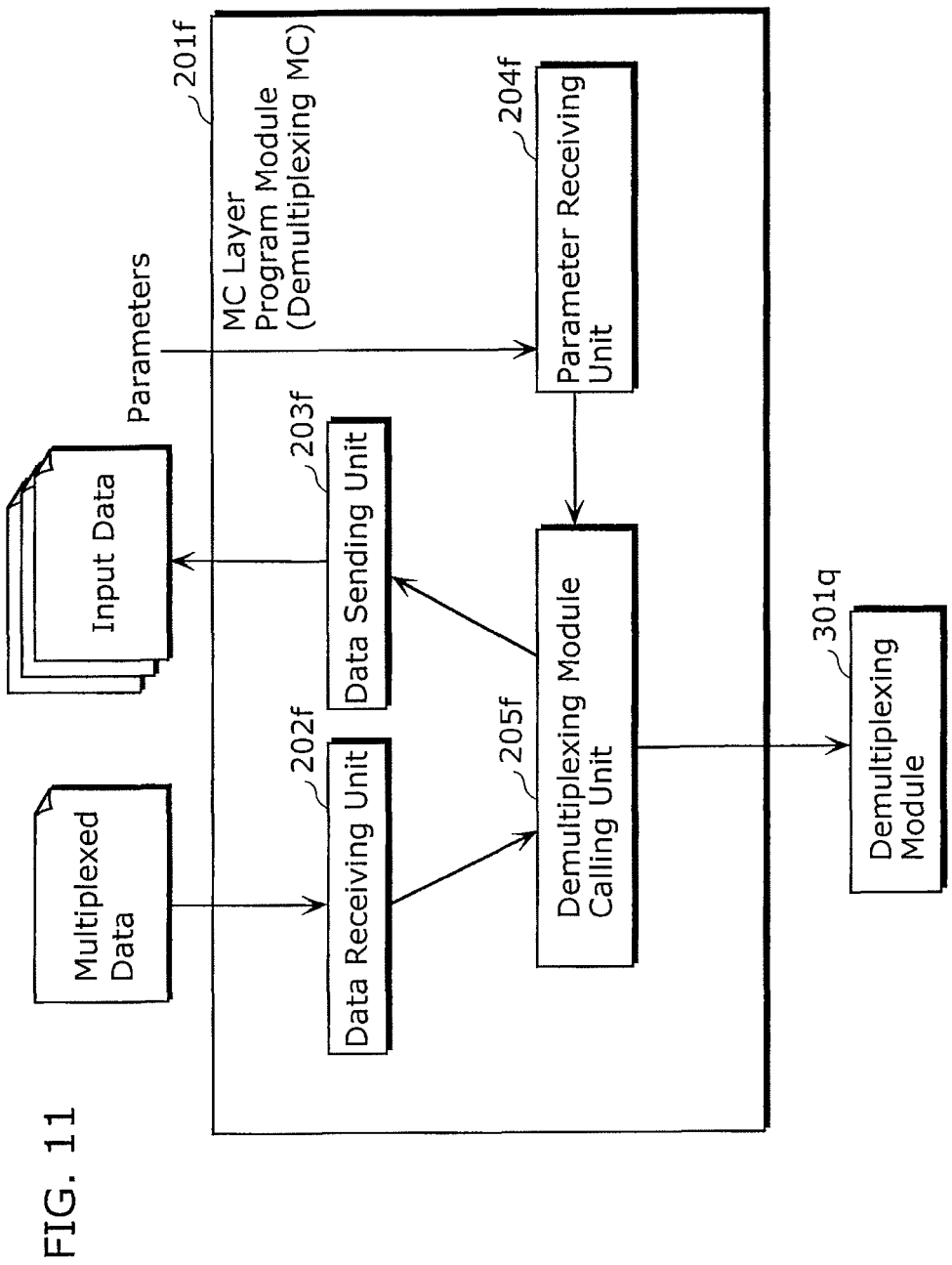
FIG. 11 is a block diagram showing a configuration of a media controller layer program module (demultiplexing MC)

FIG. 11 is a block diagram showing a configuration of a media controller layer program module (demultiplexing MC). In FIG. 11, a demultiplexing MC 201f has the same configuration as the MC layer program module 201 shown in FIG. 5, and is designed for use in demultiplexing multiplexed data. A data receiving unit 202f receives multiplexed data from a video playback MM 101d and the like. A data sending unit 203f sends demultiplexed, separate units of output data to the video playback MM 101d and the like. A parameter receiving unit 204f receives specifications from a video playback MM and the like, such as a specification of an ML layer program module 301 (a demultiplexing processing module 301q) and a specification of operation parameters thereof, and so on. A demultiplexing module calling unit 205f repeatedly calls the demultiplexing processing module 301q.

FIG. 12 is a block diagram showing a configuration of a media module layer program module (video playback MM). In FIG. 12, a video playback MM 101d has the same configuration as the MM layer program module 101 shown in FIG. 4, and is designed for use in video playback. A command processing unit 102d receives and analyzes commands related to video playback. A time management unit 103d determines the operation timing of an AV data input/output control unit 104d, a call time in each audio frame cycle, and a call time in each video frame cycle. Upon this determination, the AV data input/output control unit 104d controls the input of AV data from the stream I/O unit 13 and the output of decoded audio data and decoded video data to the AV I/O unit 15. A media data conversion control unit 105d includes a demultiplexing control unit 105d1 and an AV playback data generation control unit 105d2. The demultiplexing control unit 105d1 cyclically calls the demultiplexing MC 201f. The AV playback data generation control unit 105d2 calls the audio playback MC 201c and a video playback MC 201i at a time when each is to be called.

Figure 13:
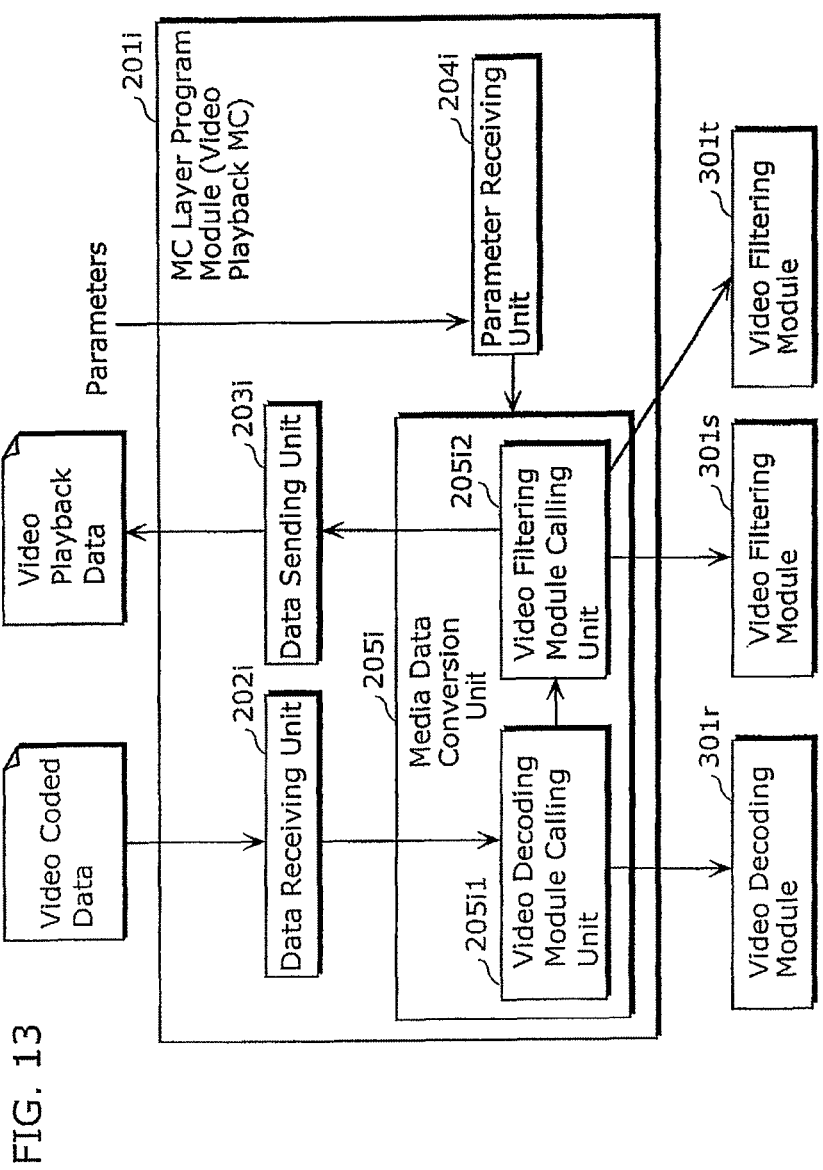
FIG. 13 is a block diagram showing a configuration of a media controller layer program module (video playback MC)

FIG. 13 is a block diagram showing a configuration of a media controller layer program module (video playback MC). In FIG. 13, a video playback MC 201*i* has the same configuration as the MC layer program module 201 shown in FIG. 5, and is designed for use in video playback. Also in this diagram, a data receiving unit 202*i* receives encoded video data (video coded data) from the video playback MM 101*d*. A data sending unit 203*i* sends video data (video playback data).

A parameter receiving unit 204*i* receives specifications from the video playback MM 101*d*, such as a specification of plural ML layer program modules 301 (a video decoding module 301*r*, a video filtering module 301*s*, a video filtering module 301*t*) and a specification of the calling order thereof, and a specification of the operation parameters for each ML layer program module 301.

A media data conversion control unit 205*i* includes a video decoding module calling unit 205*i*1 and a video filtering module calling unit 205*i*2. The video decoding module calling unit 205*i*1 calls the video decoding module 301*r* of the media library layer, which decodes encoded video data. The video filtering module calling unit 205*i*2 calls the video filtering module 301*t*, which performs first-step filtering of decoded video data from the video decoding module 301*r*, and furthermore calls the video filtering module 301*s*, which performs second-step filtering on the post-first-step filtering video data.

Figure 14:
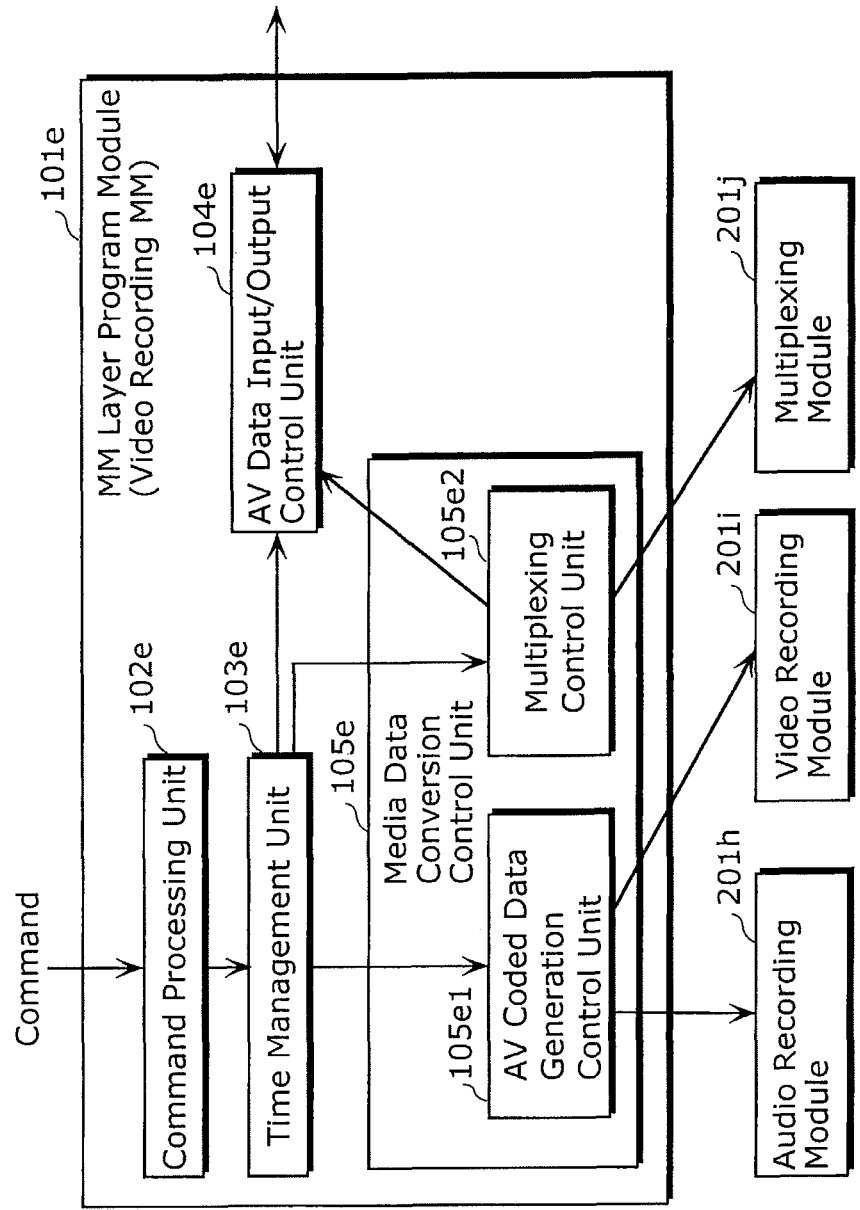
FIG. 14 is a block diagram showing a configuration of a media module layer program module (video recording MM)

FIG. 14 is a block diagram showing a configuration of a media module layer program module (video recording MM). In FIG. 14, a video recording MM 101*e* has the same configuration as the MM layer program module 101 shown in FIG. 4, and is designed for use in video recording. A command processing unit 102*e* receives and analyzes commands related to video recording. A time management unit 103*e* determines the operation timing of an AV data input/output control unit 104*e*, a call time in each audio frame cycle, and a call time in each video frame cycle. Upon this determination, the AV data input/output control unit 104*e* controls the input of audio data and video data from the AV I/O unit 15 and the output of AV data to the stream I/O unit 13. A media data conversion control unit 105*e* includes an AV coded data generation control unit 105*e*1 and a multiplexing control unit 105*e*2. The AV coded data generation control unit 105*e*1 calls an audio recording MC 201*h* and a video recording MC 201*i* at a time when each is to be called. The multiplexing control unit 105*e*2 cyclically calls the multiplexing MC 201*j*.

Figure 15:
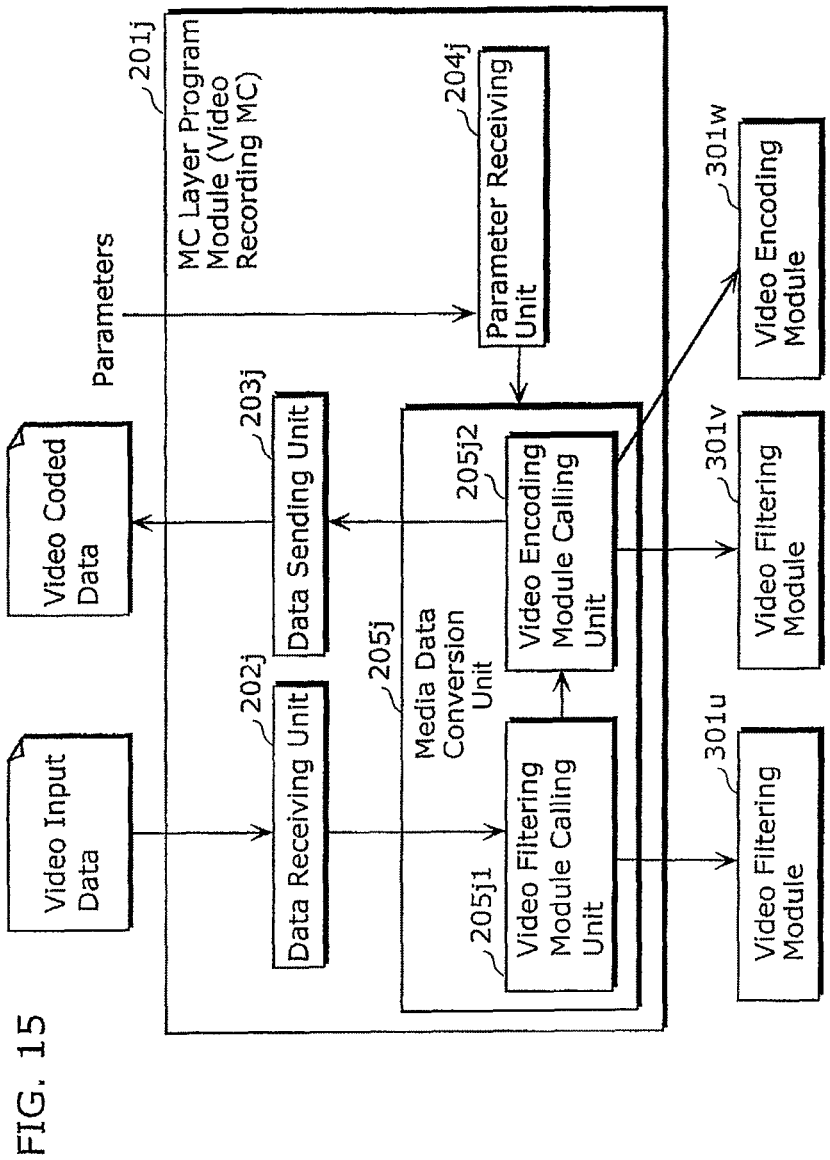
FIG. 15 is a block diagram showing a configuration of a media controller layer program module (video recording MC)

FIG. 15 is a block diagram showing a configuration of a media controller layer program module (video recording MC). In FIG. 15, a video recording MC 201*j* has the same configuration as the MC layer program module 201 shown in FIG. 5, and is designed for use in video recording. Also in this diagram, a data receiving unit 202*j* receives video data (video input data) from the video recording MM 101*e*. A data sending unit 203*j* sends encoded video data (video coded data) to the video recording MM 101*e*.

A parameter receiving unit 204*j* receives specifications from the video recording MM 101*e*, such as a specification of plural ML layer program modules 301 (a video filtering module 301*u*, a video filtering module 301*v*, a video encoding module 301*w*) and a specification of the calling order thereof, and a specification of the operation parameters for each ML layer program module 301.

A media data conversion unit 205*j* includes a video filtering module calling unit 205*j*1 and a video encoding module calling unit 205*j*2. The video filtering module calling unit 205*j*1 calls the video filtering module 301*u*, which performs first-step filtering on video data, and furthermore calls a video filtering module 301*v*, which performs second-step filtering on the post-first-step filtering video data. The video encoding module calling unit 205*j*2 calls the video encoding module 301*w* of the media library layer, which encodes the post-second-step filtering video data.

Next, the device control level API 100 shown in FIG. 3A shall be described. This API provides, to the host application, an interface with the media processing system. The host application uses this interface to control the media modules. A main function of the device control level API 100 is to perform processing such as sending/receiving stream data and control commands from the host, and controlling the media module layer. This processing consists of (a) processing commands and stream data from the host, and responding thereto, and (b) managing the state of the media modules and managing the control parameters. With the MM layer program module 101, in the abovementioned (a), the device control level API 100 analyzes the control commands along with the internal status of the media module, performs control, and with regards to the stream data, performs only sending/receiving processing. In the abovementioned (b), the device control level API 100 acts as an interface of the media modules, managing the state transitions and control parameters provided by the host application. The device control level API 100 also converts the control parameters to internal parameters used by the parameter receiving unit 204.

The device control level API 100 is started by the host per media module, and is thus made up of at least one thread. The number of threads that make up the device control level API 100 depends on the system. Furthermore, commands from the host are notified as events, and thus the device control level API 100 performs event-driven operations. An event receiving unit performs event analysis in view of the internal state and controls the lower layer based on the analysis result. The event described here may be a host command, a pipe notification, or an internal event. The host command is a notifying message provided by the host CPU via a command pipe; the pipe notification is an event that provides a notification in the case where data has been sent from the host CPU to the stream pipe; and the internal event is a message for communicating between threads within the media processor, an interrupt notification, and so on.

Event analysis refers to judging which processing to perform based on the type of event/internal state.

As explained above, with the media processing method of the present invention, it is first possible to improve the efficiency of developing the software. That is, the compatibility with software modules can be extended by standardizing roles, functions, control levels, and interfaces per layer. Accordingly, the reusability of the developed software modules can be increased, and the efficiency of software development over a wide range of target fields, from mobile devices to servers, can be improved.

Second, it is possible to improve the quality of software design. That is to say, the software can be made easier to understand by clarifying and commonizing software design principles. Furthermore, reusing a standardized software structure improves the design quality.

Third, regarding the definition of the layer structure of media processing areas, particular attention is paid to change factors unique to media processors, and by defining a software structure highly resistant to these factors, it is possible to increase the compatibility with the software modules. A change in control grain, a change in control system, a change in AV signal processing format, implementation of some functions as hardware, and the like can be given as major change factors.

With the media processing method of the present invention, it is possible to flexibly adapt even to these change factors, and possible to increase the compatibility with the program modules. For example, it is possible to easily adapt to a change in control grain. In other words, it is possible to easily adapt to each control grain, such as macro-level controls including playback/stop and micro-level controls such as 1 frame/1 image decoding. It is also easy to adapt to changes in the functions of the application acting as a host and in control systems that depend on the system configuration, and also possible to localize the impact of adding/changing functions (trick play, recording during playback, and so on) or changing the system control system (audio/video synchronization, external input/output control, and so on) according to application functions or system configurations.

Furthermore, it is possible to easily adapt to changes or additions in AV encoding standards, AV signal processing algorithms, and the like. In other words, the impact of changing/adding signal processing systems by upgrading the version of a standard, refining an algorithm, or the like can be localized. Also, it is possible to easily adapt to some functions being implemented as hardware. The impact of software corresponding to the case where functions are partially implemented as hardware, due to declining costs, increased processing efficiency, compatibility with other hardware, and so on, can be localized to the program modules which correspond to those functions, and thus it is possible to keep software changes to a minimum.

Hereafter, specific examples of products in which the media processing method of the present invention is applied shall be given.

Figure 16:
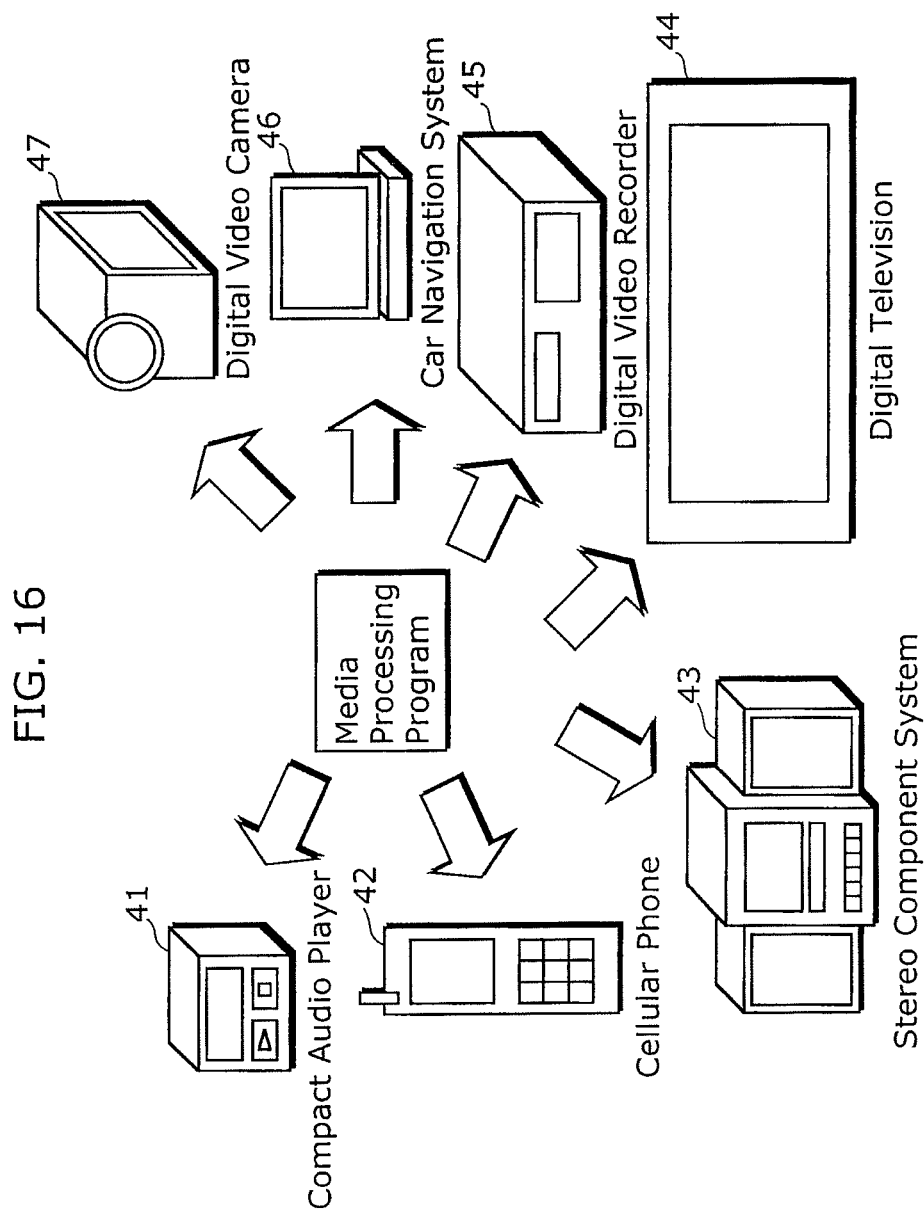
FIG. 16 is a block diagram showing a specific example of electronic appliances in which the media processing method of the present invention is applied.

FIG. 16 is a block diagram showing examples of electronic appliances in which the media processing method of the present invention is applied. In FIG. 16, the media processing method or media processing program of the present invention is applied in a compact audio player 41, a cellular phone 42, a stereo component system 43, a digital television 44, a digital video recorder 45, a car navigation system 46, a digital video camera 47, and so on. Each of the MM layer program module 101, MC layer program module 201, and media library 301, as shown in FIG. 3A, can flexibly adapt to each of these different types of electronic appliances. These program modules are highly compatible among the various electronic appliances.

Figure 17:
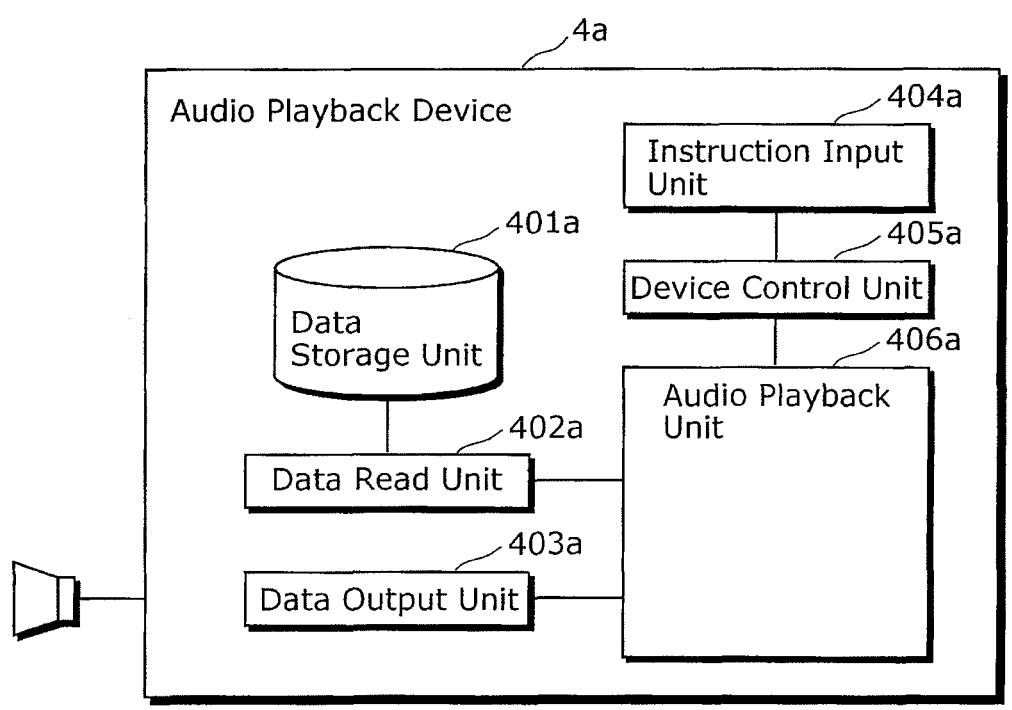
FIG. 17 is a block diagram showing a configuration of an audio playback device in which the media processing method of the present invention is applied.

FIG. 17 is a block diagram showing a configuration of an audio playback device 4a in which the media processing method of the present invention is applied. The audio playback device 4a shown in FIG. 17 includes a data storage unit 401a, a data readout unit 402a, a data output unit 403a, an instruction input unit 404a, a device control unit 405a, and an audio playback unit 406a. The data storage unit 401a in this diagram corresponds to the optical disk 22, hard disk 23, or the memory card 24 shown in FIG. 2; the data readout unit 402a corresponds to the stream I/O unit 13; the data output unit 403a corresponds to the AV I/O unit 15; the device control unit 405a corresponds to the CPU 11; the hardware configuration of the audio playback unit 406a corresponds to the media processor 12; and the software configuration of the audio playback unit 406a corresponds to the audio playback MM 101b shown in FIG. 6, the audio playback MC 201c shown in FIG. 7, and the media libraries 301j to 301l.

The data storage unit 401a stores encoded audio data.

The data readout unit 402a reads out the encoded audio data from the data storage unit 401a and supplies the encoded audio data to the audio playback unit 406a.

The data output unit 403a outputs decoded audio data generated by the audio playback unit 406a to an external device.

The instruction input unit 404a receives instructions from a user.

The device control unit 405a instructs the audio playback unit 406a to start, stop, or pause audio playback based on the instruction received by the instruction input unit 404a.

The audio playback unit 406a performs media processing which converts encoded audio data to decoded audio data through the following (a) to (c):

(a) The audio playback unit 406a executes the first program module in the first layer (here, the audio playback MM 101b, as shown in FIG. 6); through this, the audio playback unit 406a controls the input of the encoded audio data read out by the data readout unit 402a and the output of the decoded audio data to the data output unit 403a, determines at least one time at which to call a second program module (here, the audio playback MC 201c, as shown in FIG. 7), and calls a second program module in the second layer at each determined time.

(b) The audio playback unit 406a executes the third program module in the third layer (here, the media library 301j to 301l and so on) by executing the called second program module.

(c) The audio playback unit 406a performs media processing which converts inputted encoded audio data to decoded audio data by executing the called third program module.

In this manner, the audio playback unit 406a performs media processing which decodes encoded audio data for use in audio playback by executing the program modules in the three layers as shown in FIG. 3A.

Figure 18:
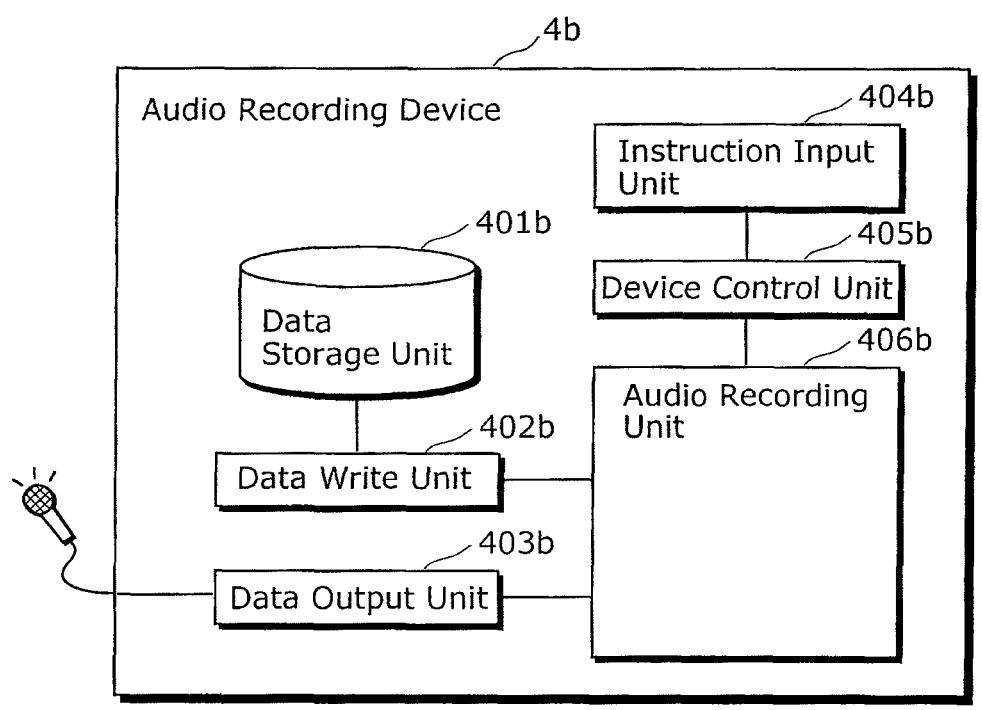
FIG. 18 is a block diagram showing a configuration of an audio recording device in which the media processing method of the present invention is applied.

FIG. 18 is a block diagram showing a configuration of an audio recording device 4b in which the media processing method of the present invention is applied. The audio recording device 4b shown in FIG. 18 includes a data storage unit 401b, a data write unit 402b, a data input unit 403b, an instruction input unit 404b, a device control unit 405b, and an audio recording unit 406b. The data storage unit 401b in this diagram corresponds to the optical disk 22, hard disk 23, or the memory card 24 shown in FIG. 2; the data write unit 402b corresponds to the stream I/O unit 13; the data input unit 403b corresponds to the AV I/O unit 15; the device control unit 405b corresponds to the CPU 11; the hardware configuration of the audio recording unit 406b corresponds to the media processor 12; and the software configuration of the audio recording unit 406b corresponds to the audio recording MM 101c shown in FIG. 8, the audio recording MC 201d shown in FIG. 9, and the media libraries 301m to 301o.

The data storage unit 401b stores encoded audio data.

The data write unit 402b writes encoded audio data outputted from the audio recording unit 406b to the data storage unit 401b.

The data input unit 403b acquires audio data from an external device and outputs the audio data to the audio recording unit 406b.

The instruction input unit 404b receives instructions from a user.

The device control unit 405b instructs the audio recording unit 406b to start, stop, or pause audio recording based on the instruction received by the instruction input unit 404b.

The audio recording unit 406b performs media processing which converts audio data into encoded audio data through the following (a) to (c):

(a) The audio recording unit 406b executes the first program module in the first layer (here, the audio recording MM 101c, as shown in FIG. 8). Through this, the audio recording unit 406b controls the input of the audio data from the data input unit 402b and the output of the encoded audio data to the data write unit 402b, determines at least one time at which to call a second program module (here, the audio recording MC 201d, as shown in FIG. 9), and calls a second program module in the second layer at each determined time.

(b) The audio recording unit 406b executes the third program module in the third layer (here, the media library 301j to 301l and so on) by executing the called second program module.

(c) The audio recording unit 406b performs media processing which converts inputted audio data to encoded audio data by executing the called third program module.

In this manner, the audio recording unit 406b performs media processing which codes audio data for use in audio recording by executing the program modules in the three layers as shown in FIG. 3A.

Figure 19:
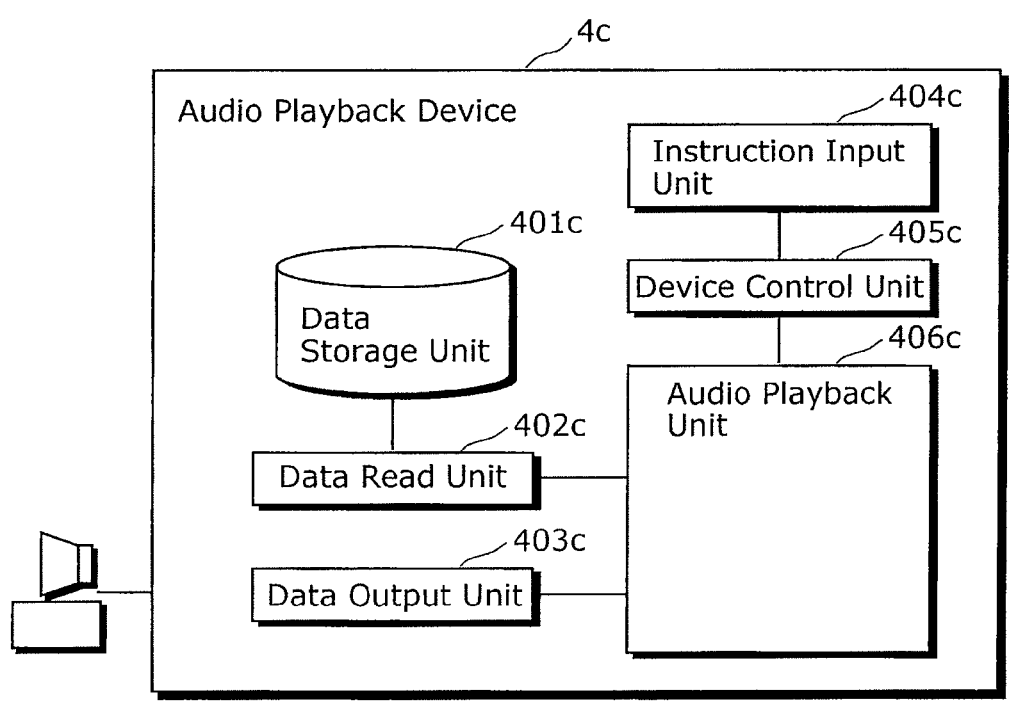
FIG. 19 is a block diagram showing a configuration of a video playback device in which the media processing method of the present invention is applied.

FIG. 19 is a block diagram showing a configuration of a video playback device 4c in which the media processing method of the present invention is applied. The video playback device 4c shown in FIG. 19 includes a data storage unit 401c, a data readout unit 402c, a data output unit 403c, an instruction input unit 404c, a device control unit 405c, and a video playback unit 406c. The data storage unit 401c in this diagram corresponds to the optical disk 22, hard disk 23, or the memory card 24 shown in FIG. 2; the data readout unit 402c corresponds to the stream I/O unit 13; the data output unit 403c corresponds to the AV I/O unit 15; the device control unit 405c corresponds to the CPU 11; the hardware configuration of the video playback unit 406c corresponds to the media processor 12; and the software configuration of the video playback unit 406c corresponds to the video playback MM 101d shown in FIG. 12, the video playback MC 201i shown in FIG. 13, and the media libraries 301r to 301t.

The data storage unit 401c stores encoded video data.

The data readout unit 402c reads out the encoded video data from the data storage unit 401c and supplies the encoded video data to the video playback unit 406c.

The data output unit 403c outputs decoded video data generated by the video playback unit 406c to an external device.

The instruction input unit 404c receives instructions from a user.

The device control unit 405c instructs the video playback unit 406c to start, stop, or pause video playback based on the instruction received by the instruction input unit 404c.

The video playback unit 406c performs media processing which converts encoded video data into decoded video data through the following (a) to (c):

(a) The video playback unit 406c executes the first program module in the first layer (here, the video playback MM 101d, as shown in FIG. 12). Through this, the video playback unit 406c controls the input of the encoded video data read out by the data readout unit 402c and the output of the decoded video data to the data output unit 403c, determines at least one time at which to call a second program module (here, the video playback MC 201i, as shown in FIG. 13), and calls a second program module in the second layer at each determined time.

(b) The video playback unit 406c executes the third program module in the third layer (here, the media library 301r to 301t and so on) by executing the called second program module.

(c) The video playback unit 406c performs media processing which converts inputted encoded video data to decoded video data by executing the called third program module.

In this manner, the video playback unit 406c performs media processing which decodes encoded video data for use in video playback by executing the program modules in the three layers as shown in FIG. 3A.

Figure 20:
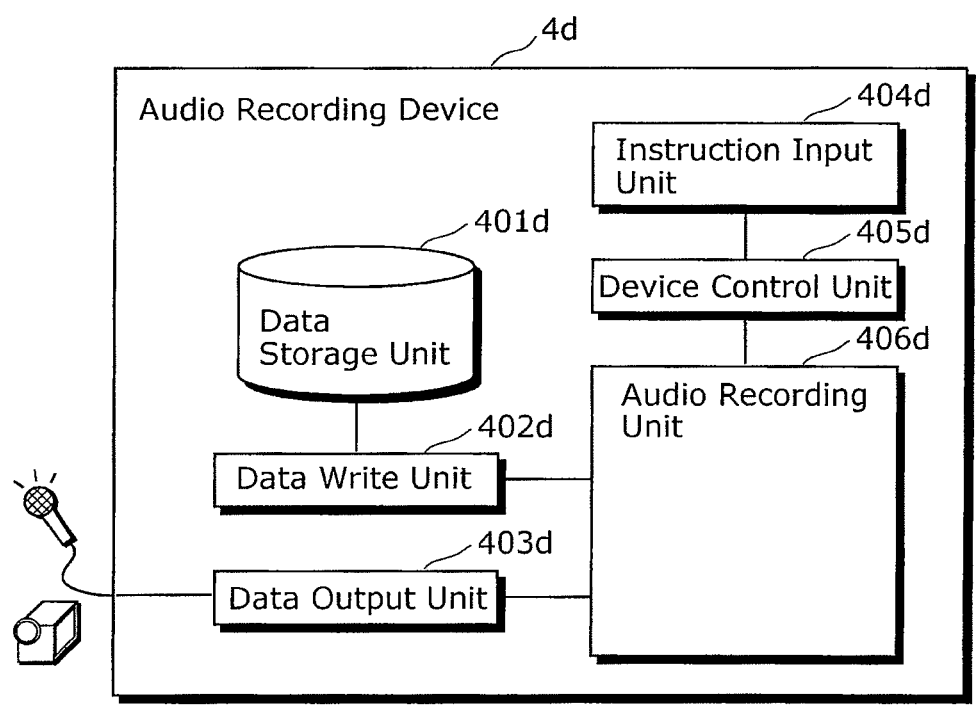
FIG. 20 is a block diagram showing a configuration of a video recording device in which the media processing method of the present invention is applied.

FIG. 20 is a block diagram showing a configuration of a video recording device 4d in which the media processing method of the present invention is applied. The video recording device 4d shown in FIG. 20 includes a data storage unit 401d, a data write unit 402d, a data input unit 403d, an instruction input unit 404d, a device control unit 405d, and a video recording unit 406d. The data storage unit 401d in this diagram corresponds to the optical disk 22, hard disk 23, or the memory card 24 shown in FIG. 2; the data write unit 402d corresponds to the stream I/O unit 13; the data input unit 403d corresponds to the AV I/O unit 15; the device control unit 405d corresponds to the CPU 11; the hardware configuration of the video recording unit 406d corresponds to the media processor 12; and the software configuration of the video recording unit 406d corresponds to the video recording MM 101e shown in FIG. 14, the video recording MC 201j shown in FIG. 15, and the media libraries 301u to 301w.

The data storage unit 401d stores encoded video data.

The data write unit 402d writes encoded video data outputted from the video recording unit 406d to the data storage unit 401d.

The data input unit 403d acquires video data from an external device and outputs the video data to the video recording unit 406d.

The instruction input unit 404d receives instructions from a user.

The device control unit 405d instructs the video recording unit 406d to start, stop, or pause video recording based on the instruction received by the instruction input unit 404d.

The video recording unit 406d performs media processing which converts video data into encoded video data through the following (a) to (c):

(a) The video recording unit 406d executes the first program module in the first layer (here, the video recording MM 101e, as shown in FIG. 4). Through this, the video recording unit 406d controls the input of the video data from the data input unit 402d and the output of the encoded video data to the data write unit 402d, determines at least one time at which to call a second program module (here, the video recording MC 201j, as shown in FIG. 15), and calls a second program module in the second layer at each determined time.

(b) The video recording unit 406d executes the third program module in the third layer (here, the media library 301u to 301w and so on) by executing the called second program module.

(c) The video recording unit 406d performs media processing which converts inputted video data to encoded video data by executing the called third program module.

In this manner, the video recording unit 406d performs media processing which codes video data for use in video recording by executing the program modules in the three layers as shown in FIG. 3A.

Figure 21:
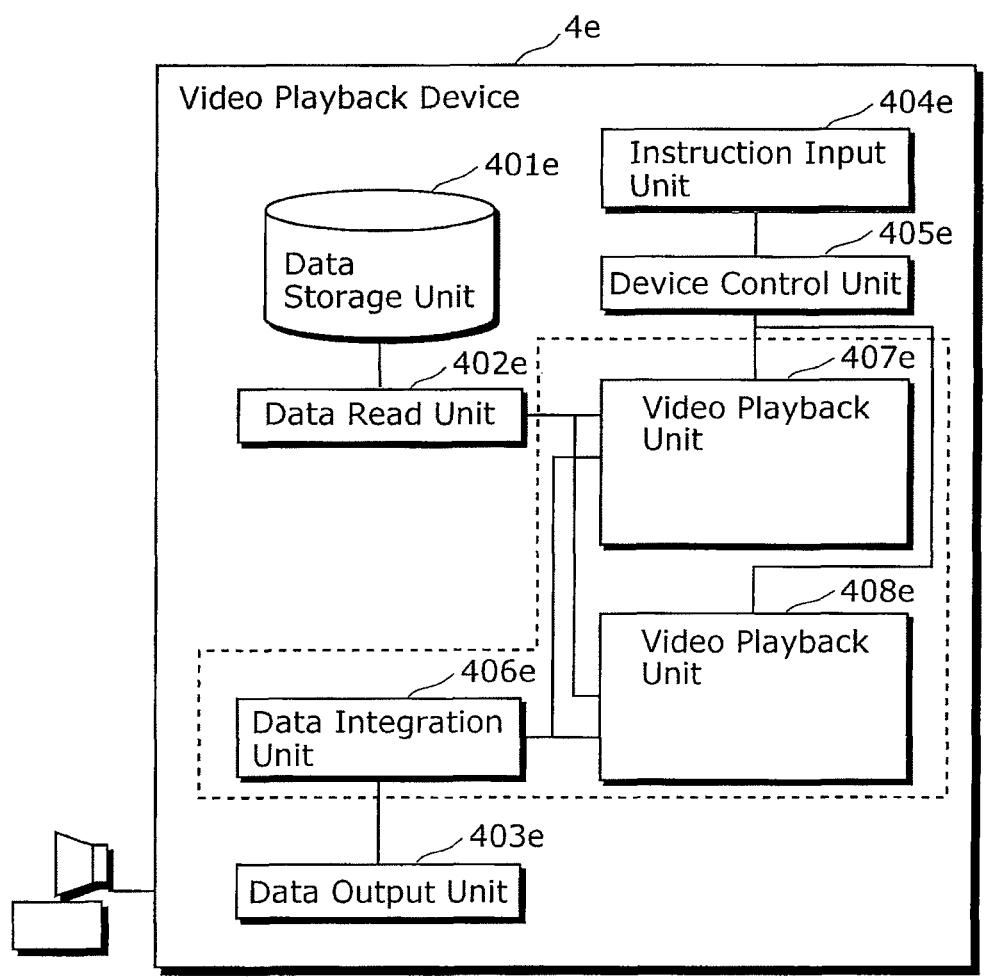
FIG. 21 is a block diagram showing a configuration of a video playback device in which the media processing method of the present invention is applied.

FIG. 21 is a block diagram showing a configuration of a video playback device 4e in which the media processing method of the present invention is applied. The video playback device 4e in FIG. 21 includes a data storage unit 401e, a data readout unit 402e, a data output unit 403e, an instruction input unit 404e, a device control unit 405e, a data integration unit 406e, and video playback units 407e and 408e, and simultaneously plays back two different pieces of encoded video data. Compared to FIG. 19, this diagram differs in that the video playback units 407e and 408e are present in place of the video playback unit 406c, and the data integration unit 406e has been added. Other corresponding constituent elements are identical and thus descriptions thereof shall be omitted; the following descriptions shall focus on the differences.

The video playback units 407e and 408e respectively decode two differing pieces of encoded video data (hereafter called first and second encoded video data respectively) and output two pieces of decoded video data (hereafter called first and second decoded video data respectively). The video playback units 407e and 408e are implemented via a single media processor. The software configurations of the video playback units 407e and 408e are identical to that of the aforementioned video playback unit 406c.

The data integration unit 406e integrates the first and second decoded video data so as to be displayed in a single screen. For example, the data integration unit 406e reduces the two videos obtained from the first and second decoded video data to the same size and arranges the two reduced-size videos side by side. The videos may, however, be arranged so that one of the videos is larger than the other. It should be noted that the data integration unit may be realized as the media processor shown in FIG. 2, or may be realized as a unit different from the media processor.

Also note that the data readout unit 402e reads out the first and second encoded video data from the data storage unit 401e and supplies the encoded video data to the video playback unit 406e. At that time, the second encoded video data may be sequentially changed to differing encoded video data.

Thus, the video playback units 407e and 408e perform media processing which decodes encoded video data for use in video playback by executing the program modules in the three layers as shown in FIG. 3A.

Note that it is also possible to realize a recording/playback device capable of simultaneously performing audio playback, audio recording, video playback, and video recording, through the same configurations as described above and shown in FIGS. 17 to 21.

In addition, a tuner that receives digital broadcasts may be provided instead of the abovementioned data storage unit.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

Industrial Applicability

The present invention can be applied in various devices that perform media processing, such as web servers that distribute video, network terminals that receive those videos, digital cameras that can record/play back videos, camera-equipped cellular phones, DVD recording/playback devices, PDAs, personal computers, and so on.

What is claimed is:

1. A media processing method for performing media processing by causing a processor to execute plural program modules, said method comprising:

controlling input/output of media data, determining a call time of each frame cycle, and calling a second program module in a second layer at each determined call time, by executing a first program module in a first layer, the first layer being higher than the second layer, the frame cycle being determined by a group of data items, and the group of data items having an amount predetermined according to the media data;

calling at least one third program module in a third layer, the third layer being lower than the second layer, by executing the second program module in the second layer; and causing the processor to perform data conversion on the media data, the data conversion being part of the media processing, by executing the third program module in the third layer.

2. The media processing method according to claim 1, wherein the first program module has first, second, third, and fourth program segments, and the controlling includes:

analyzing a command from a host program, the host program being in a layer higher than the first layer, by executing the first program segment;

determining an operation timing of the third program segment and at least one of the call times, in accordance with the analyzed command, by executing the second program segment;

controlling the input/output of the media data in accordance with the operation timing, by executing the third program segment; and calling a second program module at each call time, by executing the fourth program segment.

3. The media processing method according to claim 2, wherein the first program segment receives the command via a first application program interface, the analyzed command specifying starting, stopping, or pausing the media processing.

4. The media processing method according to claim 2, wherein the second program module has fifth, sixth, and seventh program segments, and the calling of at least one third program module includes:

receiving data to be processed from the first program module, by executing the fifth program segment;

calling, in order, at least one third program module for processing the received data, by executing the sixth program segment; and sending a result of the data conversion from the called third program module, to the first program module, by executing the seventh program segment.

5. The media processing method according to claim 1, wherein the first program module has first, second, third, and fourth program segments, and the controlling includes:

analyzing a command from a host program, the host program being in a layer higher than the first layer, by executing the first program segment;

determining an operation timing of the third program segment and at least one of the call times, when the analyzed command specifies audio playback, by executing the second program segment;

controlling input of encoded audio data and output of decoded audio data, in accordance with the operation timing, by executing the third program segment; and calling a second program module at each call time, by executing the fourth program segment.

6. The media processing method according to claim 1, wherein the first program module has first, second, third, and fourth program segments, and the controlling includes:

analyzing a command from a host program, the host program being in a layer higher than the first layer, by executing the first program segment;

determining an operation timing of the third program segment and at least one of the call times, when the analyzed command specifies audio recording, by executing the second program segment;
controlling input of audio data and output of encoded audio data, in accordance with the operation timing, by executing the third program segment; and
calling a second program module at each call time, by executing the fourth program segment.

7. The media processing method according to claim 1,
wherein the first program module has first, second, third, and fourth program segments, and
the controlling includes:
analyzing a command from a host program, the host program being in a layer higher than the first layer, by executing the first program segment;
determining an operation timing of the third program segment and at least one of the call times, when the analyzed command specifies video playback, by executing the second program segment;
controlling input of multiplexed data and output of audio data and video data, in accordance with the operation timing, by executing the third program segment; and
calling a second program module for demultiplexing the multiplexed data, a second program module for playing back the video, and a second program module for playing back the audio, based on each call time, by executing the fourth program segment.

8. The media processing method according to claim 1,
wherein the first program module has first, second, third, and fourth program segments, and
the controlling includes:
analyzing a command from a host program, the host program being in a layer higher than the first layer, by executing the first program segment;
determining an operation timing of the third program segment and at least one of the call times, when the analyzed command specifies video recording, by executing the second program segment;
controlling input of audio data and video data and output of multiplexed data, in accordance with the operation timing, by executing the third program segment; and
calling a second program module for recording the video, and a second program module for recording the audio, and a second program module for multiplexing, based on each call time, by executing the fourth program segment.

9. A non-transitory computer-readable recording medium that stores a program that, when executed by a processor, causes the processor to perform media processing, comprising:
a first program module in a first layer which controls input/output of media data, determines a call time of each frame cycle, and calls a second program module in a second layer at the determined call time, the first layer being higher than the second layer, the frame cycle being determined by a group of data items, and the group of data items having an amount predetermined according to the media data;
a second program module in a second layer which calls at least one third program module in a third layer, the third layer being lower than the second layer; and
at least one third program module in a third layer which causes the processor to perform data conversion on the media data, the data conversion being part of the media processing.

10. The non-transitory computer-readable recording medium
that stores the program according to claim 9,
wherein said first program module has first, second, third, and fourth program segments, and
the first program segment analyzes a command from a host program, the host program being in a layer higher than the first layer;
the second program segment determines operation timings of the third and fourth program segments respectively;
the third program segment controls input/output of media data in accordance with the operation timing; and
the fourth program segment calls the second program module in accordance with the operation timing.

11. The non-transitory computer-readable recording medium that stores the program according to claim 10,
wherein the first program segment receives the command via a first application program interface, the command specifying starting, stopping, or pausing the media processing.

12. The non-transitory computer-readable recording medium
that stores the program according to claim 11,
wherein said second program module has fifth, sixth, and seventh program segments, and
the fifth program segment receives data to be processed from said first program module;
the sixth program segment calls, in order, at least one third program module for processing the received data to be processed; and
the seventh program segment sends a resultant of the data conversion, from the called third program module to the first program module.

13. An audio playback device comprising:
a media processor operable to perform media processing;
a storage operable to store encoded audio data;
a readout operable to read out the encoded audio data from said storage;
a receiver operable to receive an instruction from a user;
a controller operable to instruct said media processor to commence audio playback based on the instruction received by said receiver; and
an output operable to output decoded audio data generated by said media processor to an exterior,
wherein said media processor
(a) controls input of the encoded audio data read out by said readout and output of the decoded audio data to said output, determines a call time of each frame cycle, and calls a second program module in a second layer at each determined call time, the second layer being lower than a first layer, by executing a first program module in the first layer, the frame cycle being determined by a group of data items, and the group of data items having an amount predetermined according to the audio data,
(b) calls at least one third program module in a third layer, the third layer being lower than the second layer, by executing the called second program module, and
(c) performs media processing which converts the inputted encoded audio data to decoded audio data, by executing the called third program module.

14. An audio recording device comprising:
a media processor operable to perform media processing;
a storage operable to store encoded audio data;
an acquirer operable to acquire audio data from the exterior;
a receiver operable to receive an instruction from a user;

a controller operable to instruct said media processor to commence audio recording based on the instruction received by said receiver; and a writer operable to write the encoded audio data generated by said media processor into said storage, wherein said media processor (a) controls input of the audio data acquired by said acquirer and output of the encoded audio data to said writer, determines a call time of each frame cycle, and calls a second program module in a second layer at each determined call time, the second layer being lower than a first layer, by executing a first program module in the first layer, the frame cycle being determined by a group of data items, and the group of data items having an amount predetermined according to the audio data, (b) calls at least one third program module in a third layer, the third layer being lower than the second layer, by executing the called second program module, and (c) performs media processing which converts the inputted audio data to encoded audio data, by executing the called third program module.

15. A video playback device comprising:

a media processor operable to perform media processing;

a storage operable to accumulate encoded video data;

a readout operable to read out the encoded video data from said storage;

a receiver operable to receive an instruction from a user;

a controller operable to instruct said media processor to commence video playback based on the instruction received by said receiver; and an output operable to output decoded video data generated by said media processor to the exterior, wherein said media processor (a) controls input of the encoded video data read out by said readout and output of the decoded video data to said output, determines a call time of each frame cycle, and calls a second program module in a second layer at each determined call time, the second layer being lower than a first layer, by executing a first program module in the first layer, the frame cycle being determined by a group of data items, and the group of data items having an amount predetermined according to the video data, (b) calls at least one third program module in a third layer, the third layer being lower than the second layer, by executing the called second program module, and (c) performs media processing which converts the inputted encoded video data to decoded video data, by executing the called third program module.

16. A video recording device comprising:

a media processor operable to perform media processing;

a storage operable to store encoded video data;

an acquirer operable to acquire video data from the exterior of the video recording device;

a receiver operable to receive an instruction from a user;

a controller operable to instruct said media processor to commence video recording based on the instruction received by said receiver; and a writer operable to write the encoded video data generated by said media processor into said storage, wherein said media processor (a) controls input of the video data acquired by said acquirer and output of the encoded video data to said writer, determines a call time of each frame cycle, and calls a second program module in a second layer at each determined call time, the second layer being lower than a first layer, by executing a first program module in the first layer, the frame cycle being determined by a group of data items, and the group of data items having an amount predetermined according to the video data, (b) calls at least one third program module in a third layer, the third layer being lower than the second layer, by executing the called second program module, and (c) performs media processing which converts the inputted video data to encoded video data, by executing the called third program module.

17. A video playback device comprising:

a media processor operable to perform media processing;

a storage operable to accumulate first and second encoded video data;

a readout operable to read out the first and second encoded video data from said storage;

a receiver operable to receive an instruction from a user;

a controller operable to instruct said media processor to commence playback of the first and second encoded video data based on the instruction received by said receiver; and an output operable to output first and second decoded video data generated by said media processor to the exterior, wherein said media processor (a) controls input of the first encoded video data read out by said readout and output of the first decoded video data to said output, determines a call time of each frame cycle, and calls a second program module in a second layer at each determined call time, the second layer being lower than a first layer, by executing a first program module in the first layer, the frame cycle being determined by a group of data items, and the group of data items having an amount predetermined according to the media data, (b) calls at least one third program module in a third layer, the third layer being lower than the second layer, by executing the called second program module, (c) performs media processing which converts the inputted first encoded video data to first decoded video data, by executing the called third program module, (d) controls input of the second encoded video data read out by said readout and output of the second decoded video data to said output, determines a call time of each frame cycle, and calls a fifth program module in a second layer at each determined call time, the second layer being lower than a first layer, by executing a fourth program module in the first layer, the frame cycle being determined by a group of data items, and the group of data items having an amount predetermined according to the media data, (e) calls at least one sixth program module in a third layer, the third layer being lower than the second layer, by executing the called fifth program module, and (f) performs media processing which converts the inputted second encoded video data to second decoded video data, by executing the called sixth program module.

18. The media processing method according to claim 1, wherein the group of data items is data of a video frame.

19. The media processing method according to claim 1, wherein the group of data items is data of an audio frame.

20. The media processing method according to claim 4, wherein in the calling of at least one third program module, at least one third program module is called, in order, for processing the received data, and a result is returned to the first program module, by executing the second program module, and in the controlling, output of the data returned from the second program module is controlled, by executing the first program module.

21. The media processing method according to claim 20, wherein in the calling of a second program module, at least one third program module is specified.

22. The media processing method according to claim 20, wherein in the calling of a second program module, operation parameters for at least one third program module are specified.

23. The media processing method according to claim 20, wherein in the calling of a second program module, an execution order of at least one third program module is specified.

24. The media processing method according lo Claim 2, wherein the second program module has fifth, sixth, and seventh program segments, and the calling of at least one third program module includes:
receiving plural types of data from the first program module, by executing the fifth program segment;
calling a third program module for multiplexing the received plural types of data, by executing the sixth program segment; and
sending the multiplexed data from the called third program module to the first program module, by executing the seventh program segment.

25. The media processing method according to claim 2, wherein the second program module has fifth, sixth, and seventh program segments, and the calling of at least one third program module includes:
receiving multiplexed data from the first program module, by executing the fifth program segment;
calling a third program module for demultiplexing the received multiplexed data, by executing the sixth program segment; and
sending plural types of data from the called third program module to the first program module, by executing the seventh program segment.

26. A real-time processing method for performing real-time processing by causing a processor to execute plural program modules, the method comprising:
performing time management of each frame cycle, and calling at least one second program module in a second layer, by executing a first program module in a first layer, the second layer being lower than the first layer, the frame cycle being determined by a group of data items, and the group of data items having an amount predetermined according to media data;
calling a third program module in a third layer and processing data per unit time, the third layer being lower than the second layer, by executing the second program module in the second layer; and
causing the processor to perform a process, the process being part of the real-time processing, by executing the third program module in the third layer.

* * * * *